United States Patent
Shirado

(10) Patent No.: US 9,094,630 B2
(45) Date of Patent: Jul. 28, 2015

(54) IMAGE PROCESSING APPARATUS

(71) Applicant: Hiroki Shirado, Kanagawa (JP)

(72) Inventor: Hiroki Shirado, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 13/960,056

(22) Filed: Aug. 6, 2013

(65) Prior Publication Data
US 2014/0043629 A1  Feb. 13, 2014

(30) Foreign Application Priority Data

Aug. 13, 2012  (JP) .................... 2012-179371

(51) Int. Cl.
  H04N 1/04     (2006.01)
  H04N 1/387    (2006.01)
  H04N 1/00     (2006.01)
  G06K 15/00    (2006.01)
  H04N 1/44     (2006.01)
  H04N 1/32     (2006.01)
  H04N 1/12     (2006.01)
  H04N 1/193    (2006.01)

(52) U.S. Cl.
  CPC .......... *H04N 1/3872* (2013.01); *G06K 15/4095* (2013.01); *H04N 1/0005* (2013.01); *H04N 1/00005* (2013.01); *H04N 1/00037* (2013.01); *H04N 1/00082* (2013.01); *H04N 1/00278* (2013.01); *H04N 1/32048* (2013.01); *H04N 1/32133* (2013.01); *H04N 1/4433* (2013.01); *H04N 1/12* (2013.01); *H04N 1/193* (2013.01); *H04N 2201/044* (2013.01); *H04N 2201/327* (2013.01); *H04N 2201/3208* (2013.01); *H04N 2201/3235* (2013.01); *H04N 2201/3236* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| 5,168,310 | A  | * | 12/1992 | Hayashi et al. | ............... 399/215 |
| 5,751,432 | A  | * | 5/1998  | Gwaltney       | ........................ 358/296 |
| 6,088,546 | A  | * | 7/2000  | Inoue et al.   | ........................ 399/45 |
| 6,509,964 | B2 | * | 1/2003  | Wiles et al.   | ............... 356/237.2 |
| 6,560,351 | B1 | * | 5/2003  | Hirota         | ........................... 382/108 |
| 7,391,518 | B1 | * | 6/2008  | Schwarz et al. | ............. 356/446 |
| 7,397,565 | B2 | * | 7/2008  | Nakaya et al.  | ................ 356/446 |
| 2005/0135851 | A1 | * | 6/2005 | Ng et al.      | ....................... 399/341 |
| 2009/0169112 | A1 | * | 7/2009 | Inoue et al.   | .................. 382/199 |
| 2010/0097666 | A1 | * | 4/2010 | Makino et al.  | ............... 358/475 |
| 2012/0057211 | A1 |   | 3/2012 | Shirado        |                  |

FOREIGN PATENT DOCUMENTS

| JP | 04080739 | A | * | 3/1992 | ............. G03B 27/72 |
| JP | 04145766 | A | * | 5/1992 | ............. H04N 1/40 |

(Continued)

*Primary Examiner* — Dung Tran
(74) *Attorney, Agent, or Firm* — Oblon, McClelland, Maier & Neustadt, L.L.P.

(57) ABSTRACT

An image processing apparatus includes a scanning unit, a gloss detecting unit, and a glossy information processing unit. The scanning unit includes a light source and is configured to scan a document to be scanned at a first illumination position not resulting in halation caused by light of the light source output to the document, and scan the document at a second illumination position resulting in halation caused by the light output to the document. The gloss detecting unit is configured to detect a glossy portion of the document based on images scanned at the first illumination position and the second illumination position. The glossy information processing unit is configured to perform a predetermined process by using information represented by the detected glossy portion.

9 Claims, 18 Drawing Sheets

(56) References Cited

FOREIGN PATENT DOCUMENTS

| | | |
|---|---|---|
| JP | 06-070097 | 3/1994 |
| JP | 2001-265181 | 9/2001 |
| JP | 2005-170007 | 6/2005 |
| JP | 2010-102032 | 5/2010 |
| JP | 2012186515 A * 9/2012 | ............... H04N 1/04 |

* cited by examiner

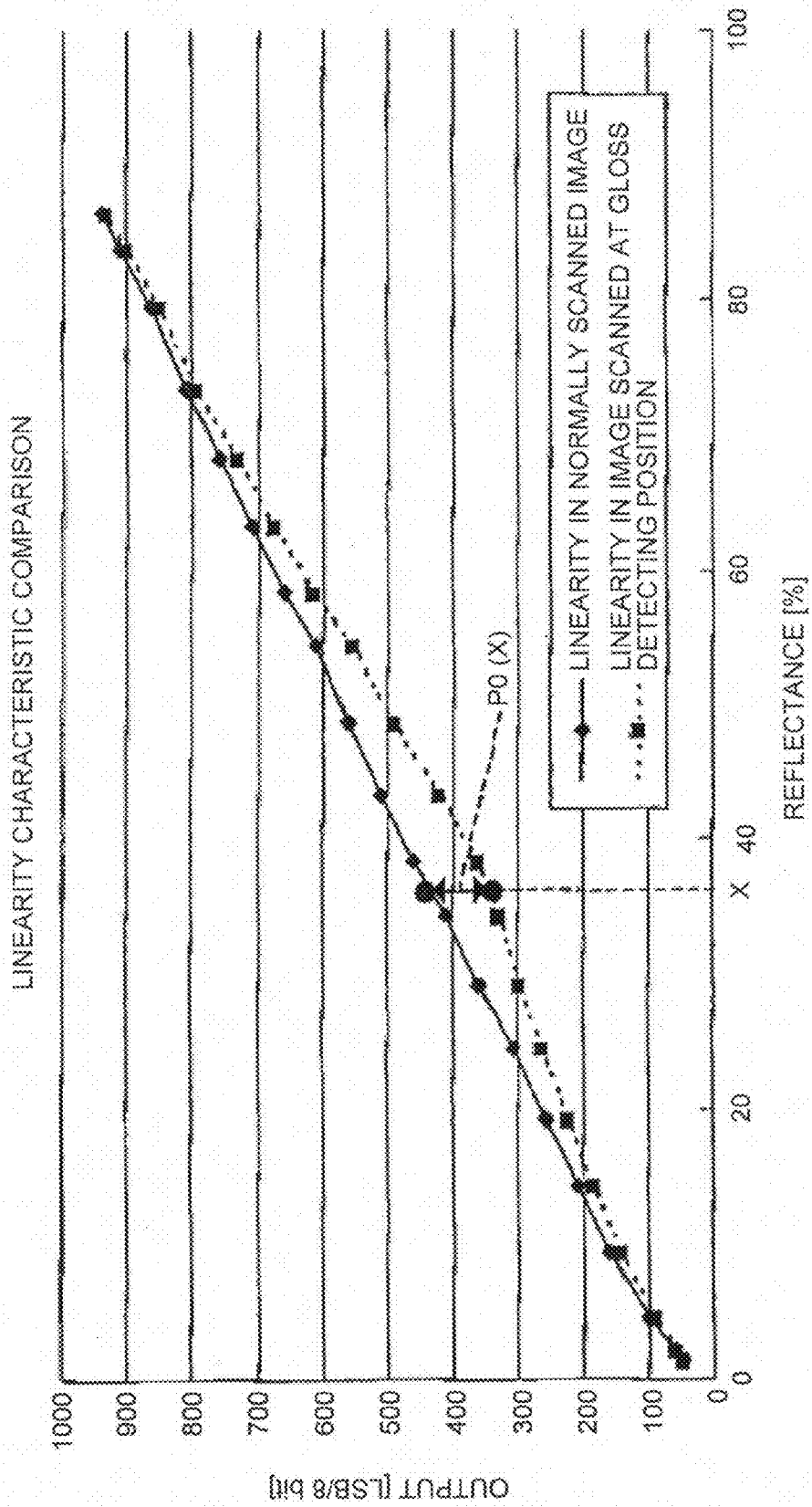

REGISTERED INFORMATION

ID INFORMATION (HALATION IMAGE)

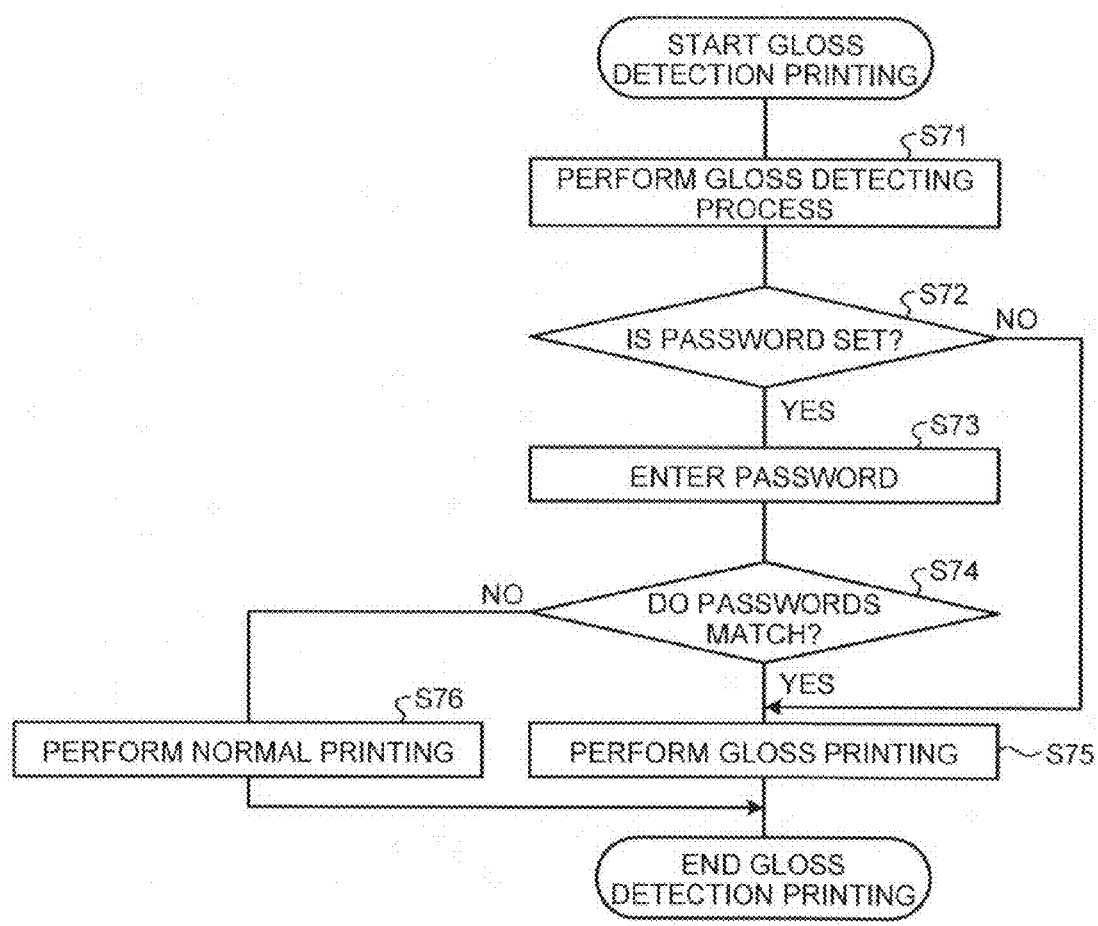

IMAGE PROCESSING APPARATUS

CROSS-REFERENCE TO RELATED APPLICATIONS

The present application claims priority to and incorporates by reference the entire contents of Japanese Patent Application No. 2012-179371 filed in Japan on Aug. 13, 2012.

BACKGROUND OF THE INVENTION

1. Field of the Invention

The present invention relates to an image processing apparatus such as an image reading device that scans an image of a document or an image forming apparatus including an image reading device.

2. Description of the Related Art

A technology called marking, typical example of which is a barcode, has been available.

With this technology, a document printed with a specific pattern can be scanned, and information represented in a pattern extracted from the image thus scanned can be taken out.

Such a technology is currently used in various applications.

For example, often found on a label on a product or a publication is a barcode (Quick Response (QR) code (registered trademark)) for guiding a user to a web site related the product or the publication.

A background pattern for indicating that copying with a copier is permitted or prohibited is also used in office documents.

A barcode is a pattern that occupies a local area of a document, whereas a background pattern is a pattern composed of a large number of small dots or lines superimposed with the content of the document. Both of these patterns can be said to be "distractive" to a user viewing the label, the publication, or the document.

It is because a pattern understood by a machine is mixed with a piece of content (characters or shapes) viewed and understood by a human on the same page.

In order to make a pattern such as a barcode or a background pattern in the content of a document not "distractive", such a pattern can be printed with a toner (ink) of a less visible color, for example.

Recently, it has become possible to use a clear toner in the electrophotographic process in an image forming apparatus such as a facsimile, a printer, a copier, or a multi-function peripheral (MFP). In this context, the clear toner is considered as an alternative for making a pattern such as a barcode or a background pattern in the content of a document not "distractive".

A pattern such as a barcode or a background pattern can be made not "distractive" if the pattern is printed using a clear toner, but then extraction of the pattern becomes an issue.

To explain further, an image reading device (scanner) for reading the image of a document is incapable of reading a pattern formed with a clear toner that is not visible to a human.

This is because a general image reading device is designed to acquire an image having the same appearance as that observable by a human.

Therefore, such an issue cannot be addressed unless such a design is somewhat changed.

As solutions addressing such an issue, following technologies have been disclosed.

(1) Technology Mixing Special Material to Clear Toner

These include technologies disclosed in Japanese Patent Application Laid-open No. 2005-170007 and Japanese Patent Application Laid-open No. 2001-265181. In the technology according to the former disclosure, an image is formed on a document with a fluorescent ink that becomes fluorescent under ultraviolet. The document is then irradiated with ultraviolet, and the image is detected via the light emitted from the fluorescent ink. In the technology according to the latter disclosure, an invisible image is formed on a document using a recording material having an absorption range for invisible light. The document is then irradiated with invisible light including infrared, and the invisible image is detected based on the portion where the light is absorbed.

(2) Technology Increasing Gloss Using Clear Toner

An area applied with a clear toner has increased smoothness, and is glossy. An area not applied with a clear toner maintains low smoothness of the original paper, and is not glossy.

Therefore, in the technology disclosed in Japanese Patent Application Laid-open No. H06-070097, a binary pattern is observed from these areas by detecting a specular reflection. Such a technology produces an image that is visible to a human when viewed from a particular angle, but is not "distractive" as much.

(3) Japanese Patent Application Laid-open No. 2010-102032 discloses a technology that provides a charge-coupled device (CCD) for detecting diffuse reflections so that only diffuse reflections are detected, because the color of a document (wavelengths absorbed by a document) can be read more precisely by detecting diffuse reflections rather than a specular reflection.

The light amount of diffuse reflections increases or decreases depending on the color of a document (the color of the paper itself and the color of a toner or an ink attached to the paper) and the gloss level.

As illustrated in FIG. 9, there is a theorem that the amount of diffuse reflections with respect to incident light becomes smaller on a glossy area that is glossy in the document illustrated in section (b) in FIG. 9, compared with that on a non-glossy area without any gloss in the document illustrated in section (a) in FIG. 9, as long as the color of the document is the same.

This theorem is used in detecting a gloss pattern on a paper surface (portions to which no toner or ink is attached).

In the technology described in (1) above, a binary pattern image in which the light is absorbed by a different degree can be detected as long as such a pattern includes an area printed with a fluorescent ink (glossy portion) and an area not printed with a fluorescent ink. Furthermore, a fluorescent ink itself is not distractive because a fluorescent ink is transparent. However, because a special illumination and light receiving element covering a invisible wavelength range need to be provided to the image reading device, costs in manufacturing of the image reading device are increased, disadvantageously.

Although the technology described in (2) above is not intended for reading a gloss pattern (glossy portion), a gloss pattern can be read using a light receiving element for a specular reflection.

However, because a special light receiving element is provided to the image reading device, the system of the image reading device increases in scale, and costs in manufacturing of the image reading device are increased, disadvantageously.

In the technology described in (3) above, scanning is performed with an illumination having a certain light amount (85 percent of a common light amount), and brightness of a glossy area (glossy portion) and that of a non-glossy area are identified based on a frequency distribution (histogram) of the brightness values across the image thus acquired. Therefore, a special illumination or light receiving element does not need to be provided to the image reading device, and an increase of manufacturing costs of the image reading device can be avoided.

However, such an image reading device cannot accommodate with diverse paper types, disadvantageously.

That is, the image reading device might not be capable of detecting a pattern correctly depending on the whiteness of paper.

While the image reading device might be able to detect a pattern on a highly white paper sheet, the image reading device might not be able to detect a pattern on a less white paper sheet, because the brightness of the glossy area and that of the non-glossy area become too close to be distinguished.

Furthermore, none of the technologies described above does not provide means for fully taking advantage of the information represented in a glossy portion provided in addition to a normal image.

Therefore, there is a need for an image processing apparatus capable of achieving highly useful image processing that uses information represented in a glossy portion.

SUMMARY OF THE INVENTION

According to an embodiment, an image processing apparatus includes a scanning unit, a gloss detecting unit, and a glossy information processing unit. The scanning unit includes a light source and is configured to scan a document to be scanned at a first illumination position not resulting in halation caused by light of the light source output to the document, and scan the document at a second illumination position resulting in halation caused by the light output to the document. The gloss detecting unit is configured to detect a glossy portion of the document based on images scanned at the first illumination position and the second illumination position. The glossy information processing unit is configured to perform a predetermined process by using information represented by the detected glossy portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a graph of linearity approximation lines;

FIG. 19 is a flowchart illustrating an example of gloss detection printing including user authentication performed by each of the units included in the image forming apparatus 100 illustrated in FIG. 16.

DETAILED DESCRIPTION OF THE PREFERRED EMBODIMENTS

Some embodiments of the present invention will now be explained specifically with reference to some drawings.

Figure 2:
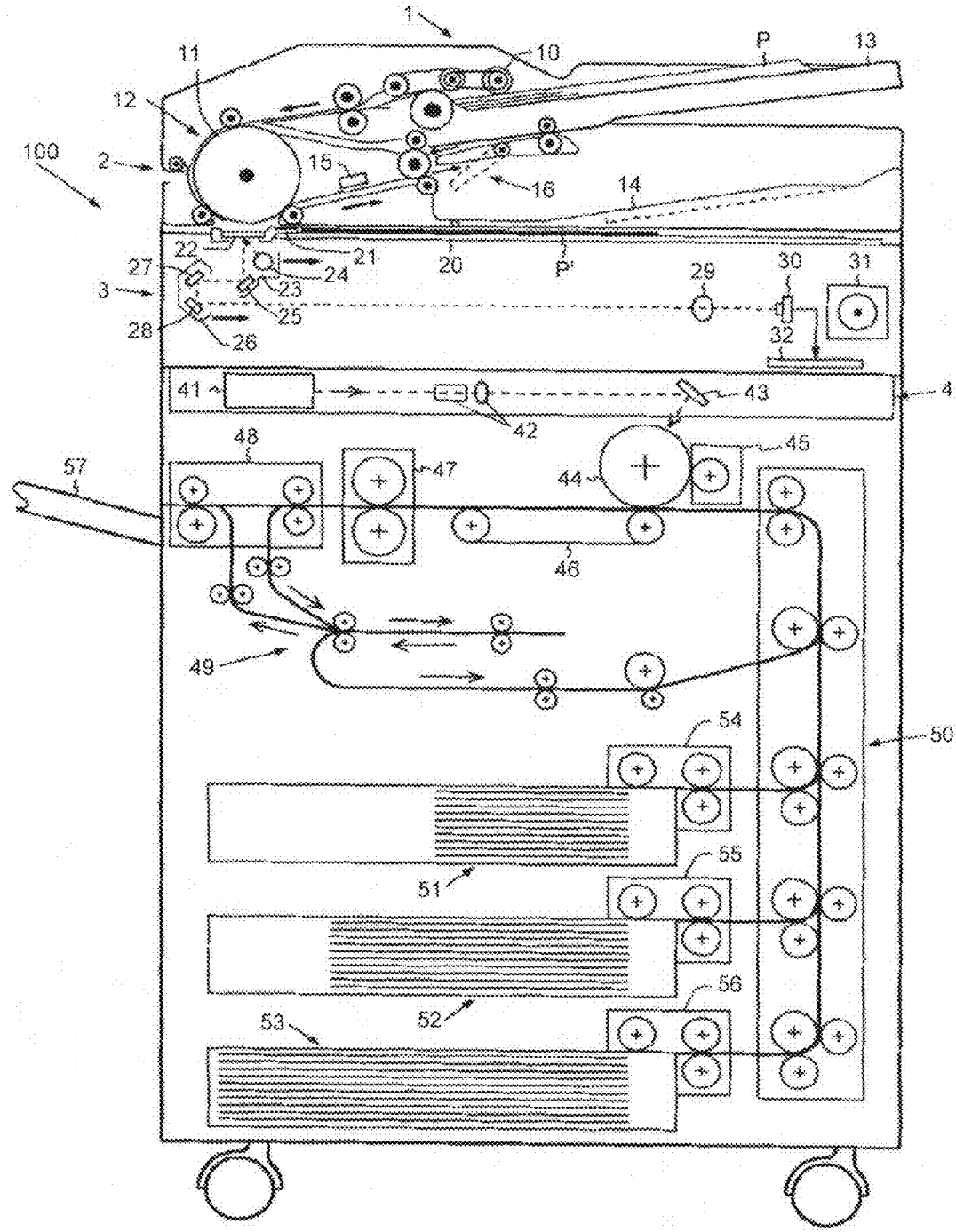
FIG. 2 is a schematic illustrating a structure of mechanical parts of an image forming apparatus according to one embodiment of the present invention.

FIG. 2 is a schematic illustrating a structure of mechanical parts of an image forming apparatus 100 that is an image processing apparatus according to an embodiment of the present invention.

The image forming apparatus 100 is an MFP in which a plurality of functions including a copier function, a printer function, and a communicating function achieving communication via a facsimile and communication over the Internet are integrated. An image reading device (scanner) 1 is mounted on the upper portion of the main unit of the image forming apparatus 100. On the front side of the top surface of the image forming apparatus 100, an operating unit not illustrated is provided.

The image reading device 1 includes an automatic document feeder (ADF) 2 and a scanning unit 3.

The ADF 2 conveys a sheet-like document P placed on a document tray 13 with driving conveying rollers 12 and the like, including a pickup roller 10 and a carriage drum 11, so that the document P is passed across the position of a document sheet glass 22 in the scanning unit 3 at a constant speed. The document P having its image scanned by the scanning unit 3 is conveyed and discharged onto a discharge tray 14.

The scanning unit 3 is a scanning unit for irradiating a document to be scanned with light from a light source thereof, which is described later, and reading an image of the document based on the light reflected from the document. The scanning unit 3 is capable of positioning the light source at a first illumination position not resulting in halation caused by the light output to the document and reading an image without halation, and is also capable of positioning the light source at a second illumination position resulting in halation caused by the light output to the document and reading the image of the document with halation, in order to detect a glossy portion of the document.

An exposure glass 20, a reference white plate 21, and the document sheet glass 22 are positioned on top of the scanning unit 3.

The exposure glass 20 is provided for placing a document P' in a book document scanning mode (also referred to as a "pressurizing plate scanning mode").

The book document scanning mode is a mode in which an image of the document P' is scanned while a first carriage 23 and a second carriage 26 are moved with respect to the reference white plate 21 and the document P' that is placed on the exposure glass 20.

The document sheet glass 22 is provided at a sheet document scanning position at which the document P carried in a sheet document scanning mode is scanned (also referred to as a "sheet-through scanning mode").

In the sheet document scanning mode, when the reference white plate 21 is to be scanned, the reference white plate 21 is scanned after the first carriage 23 and the second carriage 26 are moved to the reference white plate 21. When the document P is to be scanned, an image of the document P is scanned while the document P is carried across the sheet document scanning position, while the first carriage 23 and the second carriage 26 are kept still at the sheet document scanning position.

The reference white plate 21 is a member that is scanned in order to acquire correction data used in shading correction, and is a member arranged along a main-scanning direction, which is one image scanning direction, and having an almost-white color in a uniform density.

The first carriage 23, the second carriage 26, a lens 29, a charge-coupled device (CCD) 30, a scanner motor 31, and a processing unit 32 are provided inside of the scanning unit 3.

The first carriage 23 includes a light source 24 and a mirror 25, and is movable in the sub-scanning direction, which is another image scanning direction.

The second carriage 26 includes mirrors 27 and 28, and is movable in the sub-scanning direction, which is the other image scanning direction, in the same manner as the first carriage 23.

The light source 24 is a lamp, and is an illumination that is turned ON when a driving voltage is applied by a lamp ballast not illustrated in FIG. 2 and outputs light for irradiating a surface to be scanned of the document P or P' from a predetermined angle.

The light output from the light source 24 is reflected on the reference white plate 21 or the surface to be scanned of the document P or P', travels via the three mirrors 25, 27, 28 and the lens 29, and becomes incident on the CCD 30 that is a photoelectric conversion element.

When the first carriage 23 and the second carriage 26 are not operating, the first carriage 23 and the second carriage 26 are kept standby at the reading position for the sheet document scanning mode.

In the book document scanning mode, the scanning unit 3 scans the reference white plate 21 and the surface of the document P' placed on the exposure glass 20 by causing the first carriage 23 and the second carriage 26 to move in the sub-scanning direction by the driving force of the scanner motor 31, which is a stepping motor as an example, while keeping the distance between the scanned surface of the document P' and the CCD 30 constant.

By contrast, in the sheet document scanning mode, the scanning unit 3 scans the surface of the document P fed by the ADF 2 without moving the first carriage 23 and the second carriage 26 from the sheet document scanning position.

The CCD 30 includes a known clock driver, timing signal generator, and signal processor that are not illustrated.

The CCD 30 outputs a voltage corresponding to the amount of incident light, and passes the voltage to the processing unit 32 as image data. After the CCD 30 reads the image of the front side of document P, the CCD 30 may read the document P again, but the rear side thereof, at the predetermined position, after the document is reversed by a document reversing mechanism 16. Alternatively, the rear side surface of the document P may be read by a contact image sensor (CIS) 15 positioned at a rear-side reading position on the downstream side of the front-side reading position in the conveying direction.

The CIS 15 directly reads an image with a linear sensor using a light emitting diode (LED) as a light source, and passes image data of the image thus read to the processing unit 32.

A writing unit 4 includes a laser output unit 41, an imaging lens 42, and a mirror 43.

Provided inside of the laser output unit 41 are a laser diode serving as a laser light source, and a polygon mirror (rotating multi-faced mirror) not illustrated rotating at a constant high speed.

The laser output unit 41 outputs a laser beam based on the image data received from the processing unit 32. The laser beam is deflected on the polygon mirror rotating at a constant speed, passed through the imaging lens 42, folded by the mirror 43, and collected at the charged surface of a photosensitive drum 44, so that an image of the laser beam is formed on the photosensitive drum 44.

The deflected laser beam is exposure-scanned in the direction perpendicular to the direction in which the photosensitive drum 44 is rotated (in the main-scanning direction), and main scanning is performed by writing and recording the image data output from a selector in a data processing unit not illustrated, in units of a line.

By repeating the main scanning at a predetermined interval corresponding to the rotational speed of the photosensitive drum 44 and the scanning density (recording density), an electrostatic latent image is formed on the charged surface of the photosensitive drum 44.

Although not illustrated, a beam sensor is provided at a position near one end of the photosensitive drum 44 irradiated with the laser beam, and generates a main scanning synchronizing signal. Based on the main scanning synchronizing signal, the timing of image recording in the main-scanning direction is controlled, and a controlling signal facilitating inputs and outputs of an image signal is generated.

As the electrostatic latent image on the photosensitive drum 44 is passed through a developing unit 45, a toner image is formed on the photosensitive drum 44.

Transfer sheets (paper sheets) on which an image is to be formed are stacked in a first paper feed tray 51, a second paper feed tray 52, or a third paper feed tray 53. Corresponding one of a first feeding device 54, a second feeding device 55, and a third feeding device 56 feeds a transfer sheet stacked in each of these paper feed trays. A vertical feeding unit 50 then conveys the transfer sheet into a position at which the transfer sheet abuts against the photosensitive drum 44. A sheet material other than a transfer sheet may also be used.

In the actual operation, one of the paper feed trays 51 to 53 is selected, and a transfer sheet is fed from the tray thus selected.

While a carriage belt (transfer belt) 46 carries the transfer sheet thus fed at a speed equal to the rotational speed of the photosensitive drum 44, the toner image on the photosensitive drum 44 is transferred onto a first surface that is one of the surfaces of the transfer sheet. The toner image is then fixed in a fixing unit 47, and the transfer sheet is discharged onto a discharge tray 57 positioned outside of the machine.

When a toner image is to be formed on both side of the transfer sheet, the path is switched using a bifurcating claw not illustrated, to convey the transfer sheet having the first surface formed with a toner image into a duplex feed path 49, without conveying the transfer sheet toward the discharge tray 57. The transfer sheet is then conveyed again, and a toner image formed on the photosensitive drum 44 is transferred onto a second surface that is the other surface of the transfer sheet. The toner image is then fixed in the fixing unit 47, and the transfer sheet is discharged onto the discharge tray 57.

An ejecting unit 48 discharges the transfer sheet onto the discharge tray 57, when a stapling mode is not selected.

In the manner described above, the image forming apparatus 100 causes the duplex feed path 49 to operate when images are formed on both sides of a transfer sheet.

With the operation explained above, the image forming apparatus 100 serves as a duplicating unit that duplicates a scanned document.

Although the imaging unit including the photosensitive drum 44 and the developing unit 45 is illustrated in a simplified manner in FIG. 2 for the convenience of illustration, the imaging unit is configured to be capable of forming an image across the entire surface of the transfer sheet with a clear toner, in addition to the color toners of cyan, magenta, yellow, and black (YMCK). This capability allows gloss of an image to be improved, and coating (protection) to be applied to the image.

A functional configuration related to image processing performed by the image reading device 1 illustrated in FIG. 2 will now be explained.

Figure 1:
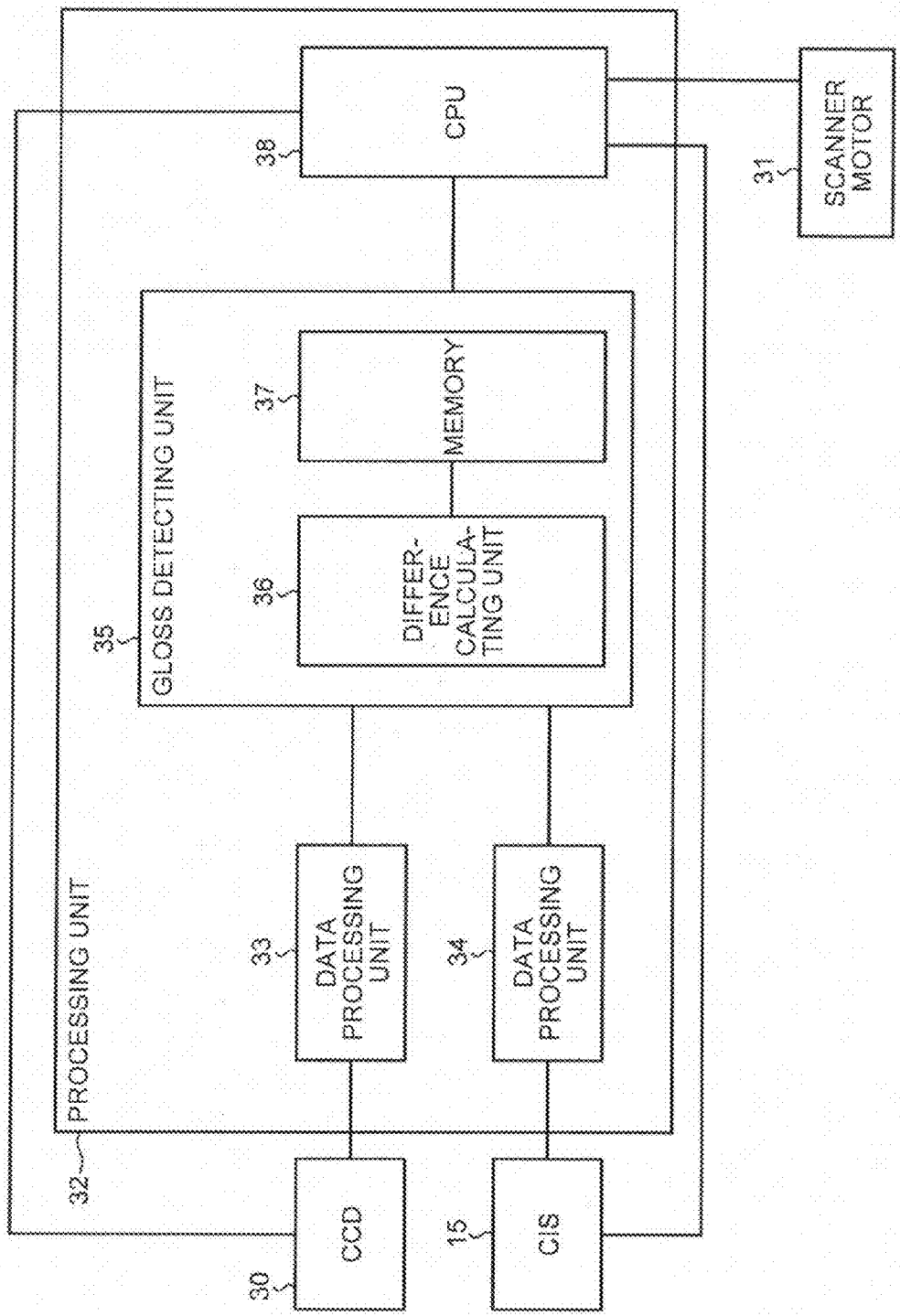
FIG. 1 is a block diagram illustrating a functional configuration related to image processing performed by an image reading device 1 illustrated in FIG. 2.

FIG. 1 is a block diagram illustrating a functional configuration related to the image processing performed by the image reading device 1 illustrated in FIG. 2.

The processing unit 32 is provided by a microcomputer, and includes a data processing unit 33, a data processing unit 34, a gloss detecting unit 35, and a central processing unit (CPU) 38.

The gloss detecting unit 35 includes a difference calculating unit 36 and a memory 37.

The image reading device 1 transmits an analog electric signal representing an image acquired by the CCD 30 to the data processing unit 33.

In the data processing unit 33, the analog electric signal representing the image is input to an analog processor that performs analog processing, via an analog signal buffer and AC coupling. The analog processor is not illustrated because the analog processor is well known.

In the analog processor not illustrated because of being well known, a line clamping circuit, a sample-and-hold (S/H) circuit, a gain processor, and an analog-to-digital (A/D) converter perform their respective processes, and digital image data representing the image of the document P or P' is acquired.

The digital image data (image data) representing the image of the document P or P' thus acquired is then applied with various types of image processing including shading correction and line pitch correction, using a dedicated image processing integrated circuit (IC) and field memory.

The shading correction is image processing for correcting irregularity in reading of the scanning system, especially, that of the optical system. The shading correction corrects uneven illumination from the light source in the illumination system including the light source 24, reduced light amounts near the edge of the optical lens, a variation in the sensitivity among the pixels of the CCD 30. The shading correction can be said to a process for achieving a uniform dynamic range for data in all of the pixels in the image data output from the scanning system.

The line pitch correction is a process for performing line correction in the sub-scanning direction on the image data. For example, when a three-line CCD 30 is used, because the document P or P' is read at different reading positions for red, green, blue (RGB), the line pitch correction makes an adjustment for the positions scanned by the lights of three colors by buffering the data of two colors in the respective field memories and changing the timing (i.e., giving an electrical delay) for reading these pieces of data of two colors so that the timing for reading these pieces of data is synchronized with the timing for reading the data of the remaining color for which the same position of the document is read at the latest timing.

Because the line pitch is also changed when a scaling factor is changed by changing the speed of the first carriage 23 and the second carriage 26, the amount of the delay is changed as required, by changing the timing at which the field memories are read.

In the book document scanning mode or in the sheet document scanning mode, the first carriage 23 and the second carriage 26 are reciprocated with respect to the surface to be scanned of the document P or P' and the reference white plate 21, based on the document size information acquired via the operating unit not illustrated or by detecting the document size. The speed of the reciprocating movement is changed by the CPU 38 sending a controlling signal to the scanner motor 31 and controlling the rotational speed of the scanner motor 31, based on a scaling factor or the like entered as well via the operating unit.

Figure 3:
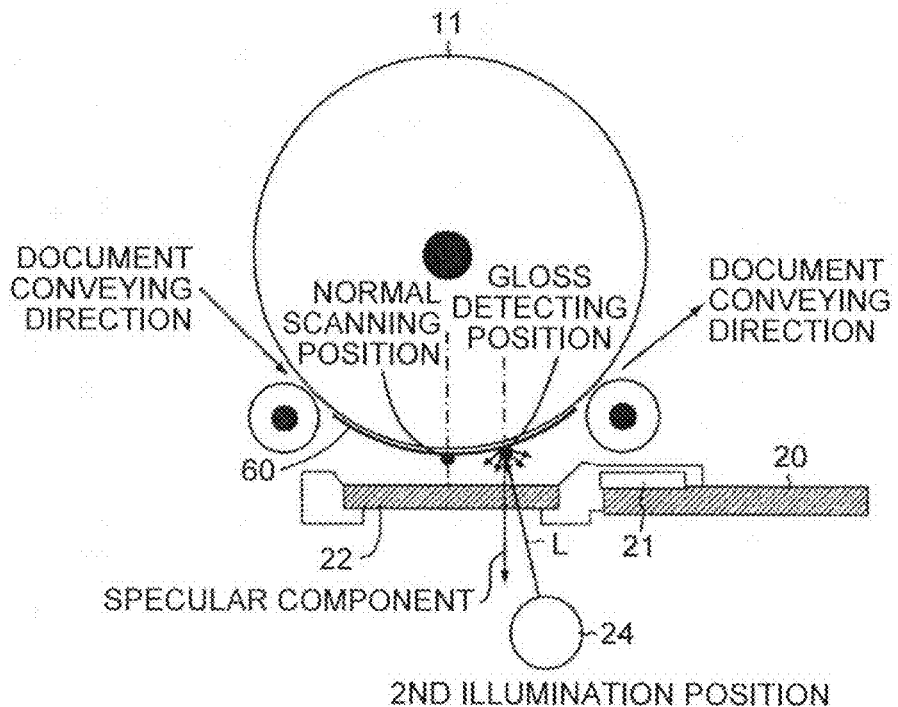
FIG. 3 is an enlarged view of a part near a carriage drum and a light source provided to the image reading device illustrated in FIG. 2.

In the sheet document scanning mode, the processing unit 32 in the image reading device 1 conveys the document P so that the surface to be scanned of the document P is bent in the sub-scanning direction with respect to light L output from the light source 24, by passing the document P along a backing plate 60 that is curved along the carriage drum 11 as illustrated in FIG. 3, while the document P is conveyed in the sub-scanning direction.

The light source 24 is then brought to a first illumination position not resulting in halation caused by the light L output to the surface to be scanned of the document P (the light L output from the light source 24 is brought to a normal scanning position in FIG. 3), and caused to illuminate the surface of the document P. The reflected light is then guided to the CCD 30 via a shrinking optical system. In this manner, an image of the front side of the document P without halation can be read in units of a line (first scanning).

The light source 24 is then moved to a second illumination position resulting in halation caused by the light L output to the surface to be scanned (moved so that the position irradiated with the light L output from the light source 24 is shifted from the normal scanning position to a gloss detecting position), and caused to illuminate the surface to be scanned of the document P. The reflected light is then guided to the CCD 30 via the shrinking optical system. In this manner, the image of the front side of the document P with halation can be read in units of a line (second scanning).

In an image reading device in which a document is irradiated diagonally with light from a scanner light source using a tube lamp or an light emitting diode (LED), generally practiced is to read the light reflected in a direction perpendicular to the document (diffuse reflection), instead of the light in a direction in which the amount of light reflected from the document is larger, that is, in the specular direction, among the lights reflected from the document, because the image can be read highly precisely, as explained earlier.

Figure 10:
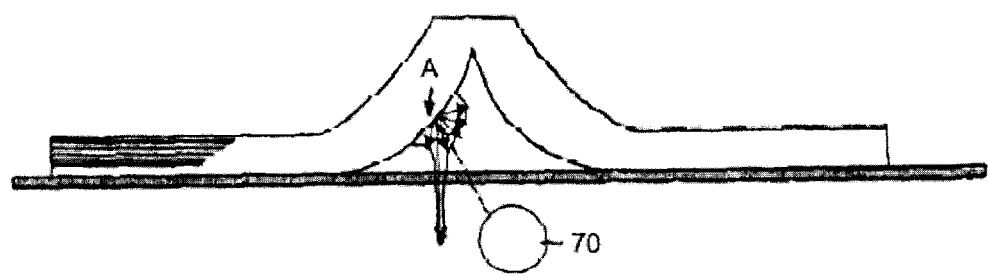
FIG. 10 is a schematic for explaining halation produced when a book document is irradiated with light.

However, even if the document is illuminated diagonally, when a bound portion of a document such as a book is scanned, for example, as illustrated in FIG. 10, at some angle of the specular reflection of the light L output from the light source 70 and illuminating a bent portion A, which is a bound portion and is positioned further away from the document platen, the specular reflection is output in a direction perpendicular to the plane along the document platen.

As a result, the specular reflection directly enters the CCD 30, and results in a light amount that is larger than the light amount of a reflection acquired when a normal document is scanned. This produces a white spot in a resultant image (halation).

Figure 9:
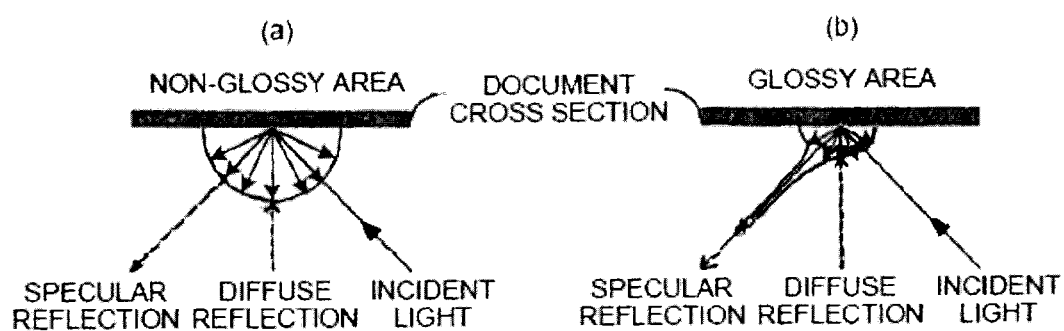
FIG. 9 is a schematic of examples of reflected lights on a glossy area and a non-glossy area in a document.

This phenomenon called halation becomes more prominent on the glossy portion having a smoother surface than a non-glossy portion, because the specular reflection increases on a smoother surface, as explained earlier with reference to FIG. 9.

Therefore, the image forming apparatus 100 according to the embodiment identifies a glossy portion and a non-glossy portion of a document P by detecting halation on the image. Specifically, in the image forming apparatus 100, the backing plate 60 is provided and the document P is scanned while the document P is bent intentionally, so that halation is reliably produced in the image.

The CPU 38 illustrated in FIG. 1 controls each of the units including the CCD 30 and the scanner motor 31 to bring the light source to the first illumination position not resulting in halation caused by the light output to the scanned surface and reads an image without halation from the scanned surface, and controls to bring the light source to the second illumination position resulting in halation caused by the light output to the scanned surface and reads an image with halation from the scanned surface. Thus, the CPU 38 serves as a part of scanning means.

The document reversing mechanism 16 illustrated in FIG. 2 then causes the document P to be reversed, so that the document having once conveyed forwardly in the sub-scanning direction is then conveyed reversely in the sub-scanning direction, while the rear side of the document P faces the light source 24. The CCD 30 can then read an image of the rear side of the document P with halation, in units of a line.

Alternatively, images of the front side and the rear side of a document may be read in the manner described below. While the front side of the document P is read in the manner described above, the CIS 15 may read an image of the rear side of the document P simultaneously, and the CIS 15 may read an image of the front side of the document P while the rear side of the document P is read in the manner described above.

The data processing unit 34 then applies the same process as that performed by the data processing unit 33 to the image data read by the CIS 15, and sends the image data to the gloss detecting unit 35.

The CPU 38 illustrated in FIG. 1 then may cause the CIS 15 to perform the scanning not resulting in halation (first scanning) while causing the CCD 30 to perform the scanning resulting in halation (second scanning), by controlling each of the units including the CCD 30, the CIS 15, and the scanner motor 31.

In other words, for example, the document reversing mechanism 16 may be caused to reverse the scanned surface of the document after the CCD 30 reads an image with halation from the scanned surface, and the CIS 15 may read an image without halation from the scanned surface. Alternatively, the order at which the scanning is performed may be reversed.

In these examples, both the CCD 30 and the CIS 15 serve as the scanning unit.

The gloss detecting unit 35 illustrated in FIG. 1 serves as gloss detecting means of detecting a glossy portion of the document based on an image with halation and an image without halation both of which are read by the scanning means.

The backing plate 60 illustrated in FIG. 3 corresponds to means of bending the scanned surface in the sub-scanning direction with respect to the light output from the light source while the document is conveyed.

The CPU 38 illustrated in FIG. 1 also serves as means of causing the light source to be moved in the sub-scanning direction, to the pre-established illumination position resulting in halation caused by the light output to the scanned surface before reading an image with halation, using the illumination position not resulting in halation as the normal position of the light source, by controlling each of the units including the CCD 30, the CIS 15, and the scanner motor 31.

The CPU 38 illustrated in FIG. 1 also serves as means of temporarily increasing the speed at which the document is conveyed when the document reversing unit reverses the document, by controlling each of the units including the scanner motor 31.

The CPU 38 illustrated in FIG. 1 also serves as a correcting unit that corrects a line pitch in the sub-scanning direction in the image with halation.

The gloss detecting unit 35 illustrated in FIG. 1 also serves as means of detecting a portion in which a difference between reflectance on the image with halation and reflectance on the image without halation, both of which are read by the scanning unit, becomes equal to or more than a predetermined level, as a glossy portion of the document.

The gloss detecting unit 35 illustrated in FIG. 1 also serves as means of correcting a difference between an reflectance-to-output characteristic in an image with halation read by the scanning unit and the reflectance-to-output characteristic in an image without halation read by the scanning unit.

A gloss detecting process performed by the image reading device 1 will now be explained.

FIG. 3 is an enlarged view of a part near the carriage drum 11 and the light source 24 provided to the image reading device 1 illustrated in FIG. 2.

Figure 5:
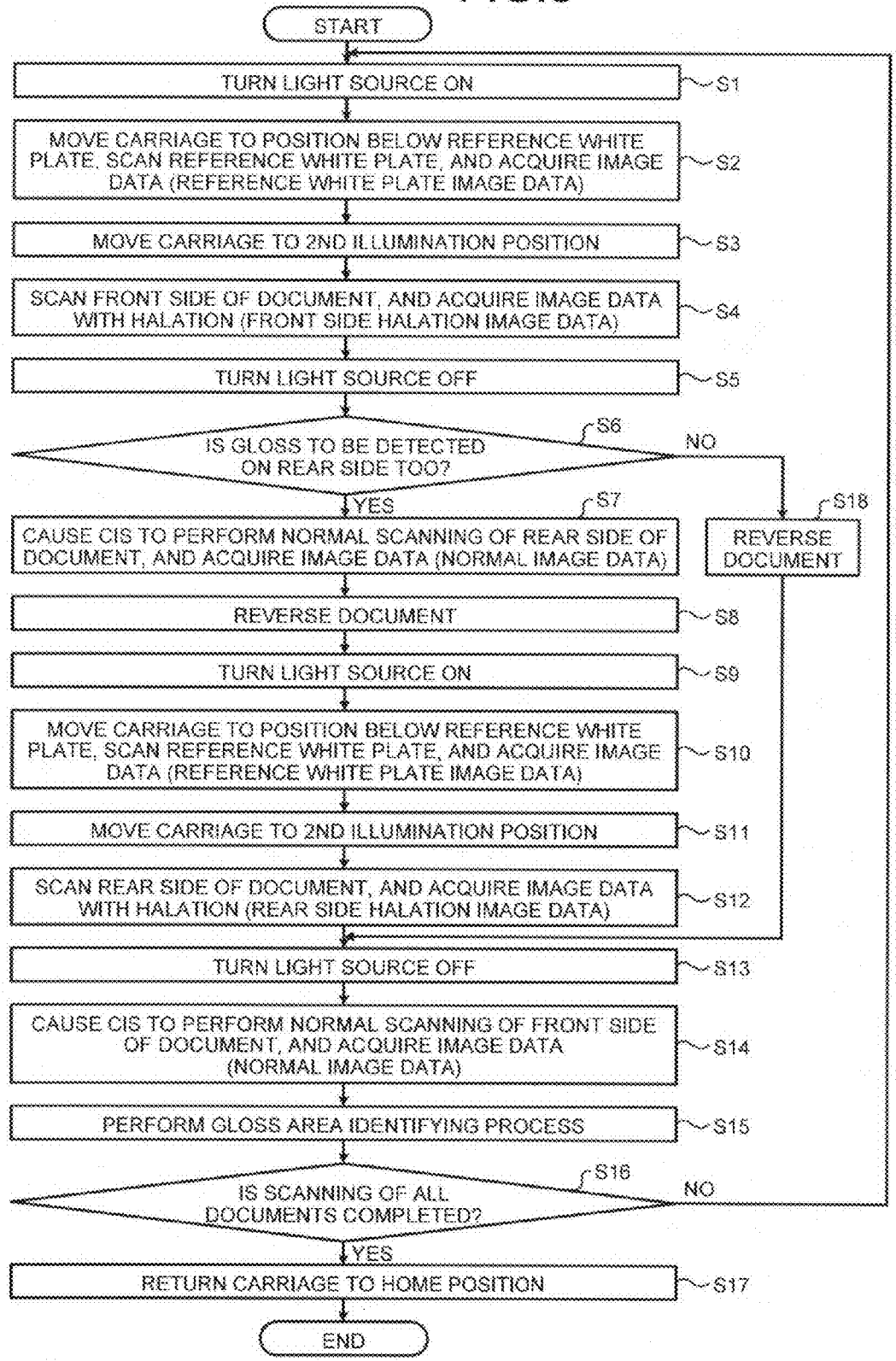
FIG. 5 is a flowchart illustrating a gloss detecting process performed by a processing unit illustrated in FIG. 1.

FIG. 5 is a flowchart illustrating the gloss detecting process performed by the processing unit 32 illustrated in FIG. 1.

Figure 6:
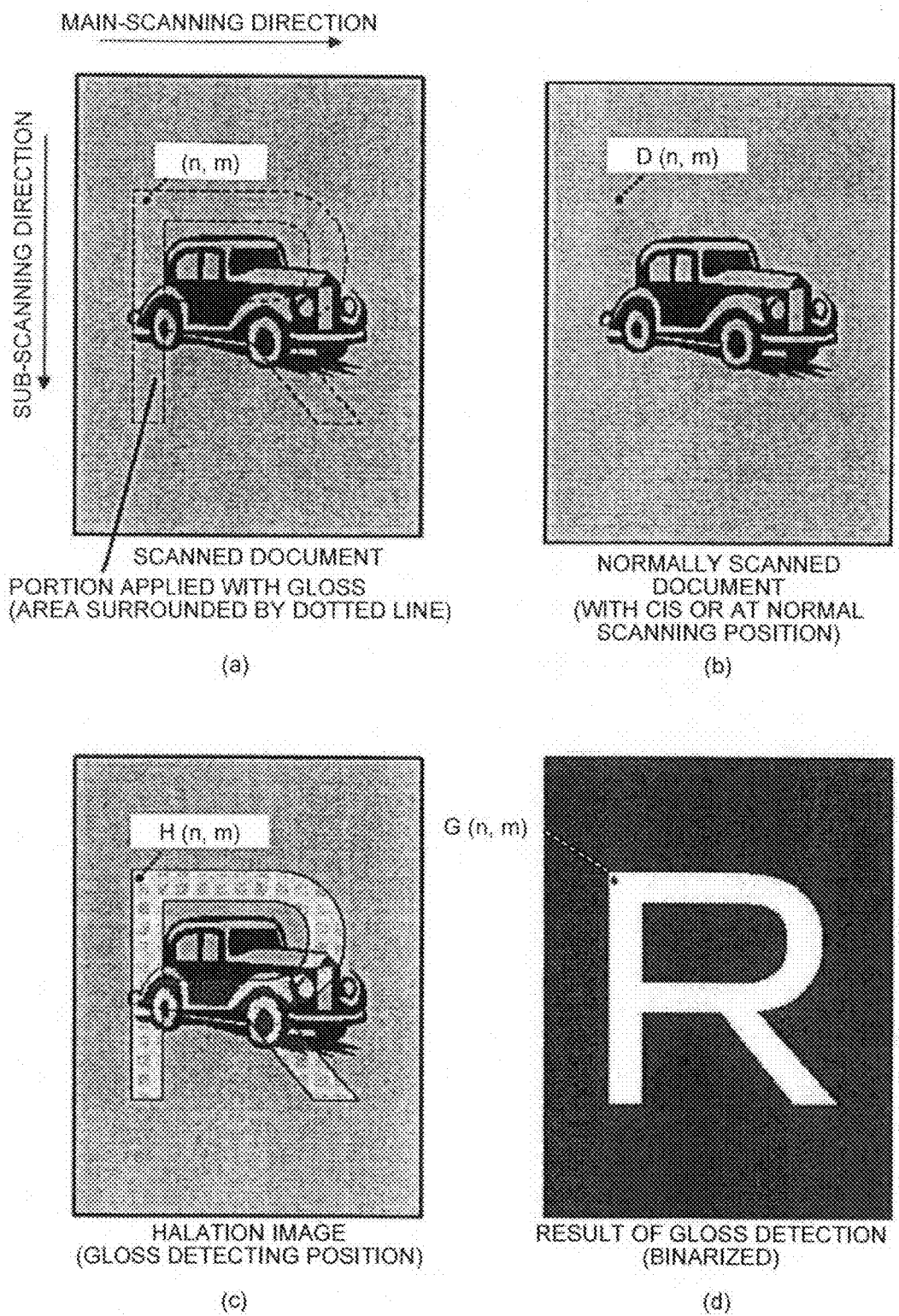
FIG. 6 is a schematic of an example of an image for explaining a glossy area identifying process performed by a gloss detecting unit illustrated in FIG. 1.

FIG. 6 is a schematic of an example of an image for explaining a glossy area identifying process performed by the gloss detecting unit 35 illustrated in FIG. 1.

As illustrated in FIG. 5, when the CPU 38 illustrated in FIG. 1 receives an instruction for gloss detecting scanning via a user instruction or automatic start, the CPU 38 turns ON the light source 24 illustrated in FIG. 2, in the same manner as for the normal scanning (Step S1), moves the first carriage (referred to as a "carriage" in FIG. 5) 23 illustrated in FIG. 2 to a position below the reference white plate 21, performs the scanning of the reference white plate 21, and acquires image data of the reference white plate 21 (reference white plate image data) (Step S2).

The carriage is then moved to move the light source 24 illustrated in FIG. 2 to the second illumination position resulting in halation caused by the light output to the scanned surface (Step S3).

When the document P is then fed, the backing plate 60 having a curved surface illustrated in FIG. 3 causes the surface to be scanned of the document P (front side) to bend in the sub-scanning direction with respect to the light output from the light source 24. By irradiating the document P with light in this condition, the specular component of the reflection from a glossy area of the surface to be scanned (front side) is increased. In this manner, image data with halation is acquired for the front side (front side halation image data) (Step S4).

Because the second illumination position of the document P resulting in halation is different depending on the light source used, and the configuration of the optical system used in the automatic document feeder, the illumination position is explored and established in the designing stage of the image reading device 1.

After the scanning of the surface on the front side of the document P, the light source 24 illustrated in FIG. 2 is turned OFF (Step S5).

It is then determined if the gloss on the rear side is to be detected (Step S6). If gloss detection is also enabled for the rear side of the document P (Yes at Step S6), the CIS 15 positioned the downstream side of the document P illustrated in FIG. 2 in the conveying direction performs the normal scanning of the rear side of the document P, and acquires the image data of the rear side (normal image data) (Step S7). The image data acquired by the CIS 15 represents a normal image without any halation.

If gloss detection is not enabled for the rear side of the document P (No at Step S6), the document P is conveyed into the document reversing mechanism 16 positioned before the discharging port, without performing the process at Step S7 at which the rear side is scanned, and the document reversing mechanism 16 is caused to reverse the document P (Step S18).

The document P having reversed at Step S8 is conveyed toward the light source 24 again. When scanning is to be performed on the rear side, as mentioned earlier, the light source 24 is turned ON at the gloss detecting position for the rear side (Step S9), and the first carriage (referred to as a "carriage" in FIG. 5) 23 illustrated in FIG. 2 is moved to the position below the reference white plate 21, caused to scan the reference white plate 21, and the image data of the reference white plate 21 (reference white plate image data) is acquired (Step S10).

The carriage is then moved to move the light source 24 illustrated in FIG. 2 to the second illumination position resulting in halation caused by the light output to the scanned surface (the rear side of the document) (Step S11).

When the document P is then fed, the backing plate 60 illustrated in FIG. 3 having a curved surface causes the surface to be scanned (rear side) of the document P to bend in the sub-scanning direction with respect to the light output from the light source 24. By irradiating the document P with light in this condition, the specular component of the reflection from a glossy area of the scanned surface is increased. In this manner, image data with halation is acquired for the rear side (rear side halation image data) (Step S12).

After the scanning of the surface on the rear side of the document P, the light source 24 illustrated in FIG. 2 is turned OFF (Step S13).

The CIS 15 positioned on the downstream side of the document P illustrated in FIG. 2 in the conveying direction is caused to read the front side of the document P in the normal mode, and acquires the image data of the front side (normal image data) (Step S14). The image data acquired by the CIS 15 represents a normal image without any halation.

The glossy area identifying process is then performed (Step S15).

The glossy area identifying process will now be explained.

The image data acquired at each Step (Steps S4, S7, S12, S14) described above is stored in the memory 37 in the gloss detecting unit 35 illustrated in FIG. 1. The difference calculating unit 36 performs a calculation using two pieces of image data that are the front side halation image data and the front side normal image data, in order to detect a glossy area on the front side of the document P. The difference calculating unit 36 also performs another calculation using another two pieces of image data that are the rear side halation image data and the rear side normal image data, in order to detect a glossy area on the rear side of the document P. The difference calculating unit 36 then detects the glossy area in the respective sides based on the results of these calculations.

To explain the calculation, the image of the document P illustrated in section (a) in FIG. 6 includes an image of a gloss-applied portion (glossy pattern) represented by the portion surrounded by the dotted line in section (a) in FIG. 6, for example. (n, m) illustrated in section in FIG. 6 represents a pixel positioned at the n-th pixel in the main-scanning direction in the m-th line of the document P in the sub-scanning direction.

D(n, m) on the document P illustrated in section (b) in FIG. 6 represents a reflection level detected by the CIS 15 illustrated in FIG. 2, or by the CCD 30 when the normal scanning position is irradiated with the light L output from the light source 24.

H(n, m) on the document P illustrated in section (c) in FIG. 6 represents a reflection level detected by the CCD 30 when the normal scanning position is irradiated with the light L output from the light source 24. In this image of the scanned-surface of the document P, halation is produced, and the gloss-applied portion is represented as glossy.

A difference in linearity, which is described later, is represented as P0(D(n, m)), and the result of a calculation (D(n, m)+P0(D(n, m)))−H(n, m) is represented as P(n, m).

P0(D(n, m)) is a level difference caused by a difference in the optical systems via which the images are acquired at the CIS 15 and at the gloss detecting position. Therefore, during, for example, manufacturing process of the image reading device 1, a specific gray scale chart (without gloss) is scanned at the gloss detecting position, to acquire an image read by the CIS 15 and another image read at the gloss detecting position, and an output corresponding to a certain reflectance (e.g., at 20-point) from each of the images, as well as linearity approximation line information, are stored in the memory 37 illustrated in FIG. 1 in advance, as indicated by a linearity approximation line for the normally scanned image and a linearity approximation line for the image at the gloss detecting position, illustrated in FIG. 7.

In the linearity approximation line information, a difference at the reflectance (pixel level) X, for example, represents a level change P0(X) caused by a bulged scanned surface resulting from bending, and to a difference in the images resulting from reading the same reflectance (pixel level) X with the CIS 15 and at the gloss detecting position surface via the shrinking optical system including the CCD 30. Such a difference in the images is caused by the intrinsic difference between these optical systems.

In other words, (D(n, m)+P0(D(n, m))) serves as a prediction of a reflection level not resulting in halation when the document P is scanned at the gloss detecting position, where D(n, m) is a reflection level detected by the CIS 15 from the particular portion of the image of the document P.

If the difference between the prediction (D(n, m)+P0(D(n, m))) and H(n, m), which is the reflection level at the portion of the image actually scanned at the gloss detecting position is almost zero, that is, if (D(n, m)+P0(D(n, m)))−H(n, m) is almost zero, the portion can be considered not to have any halation.

In the glossy portion, the difference (D(n, m)+P0(D(n, m)))−H(n, m) has a specific value, and is not zero, because a level change attributable to halation is also added to P0(D(n, m)), which represents a difference in the optical systems.

If the specific value is equal to or more than $\alpha \times D(n, m)$, it is considered that P(n, m) includes a level change attributable to the halation produced in the glossy portion, and the pixel (n, m) is determined to be a glossy pixel. The glossy pixel is then set to 1.

If the specific value is not equal to or more than $\alpha \times D(n, m)$, it is determined that P(n, m) simply represents the difference in the optical systems, without representing any level change attributable to halation, and the non-glossy pixel is set to 0. In this manner, the binarization is performed.

$\alpha \times D(n, m)$ represents a minimum level change attributable to halation at the reflection level D(n, m). $\alpha$ is a correction coefficient determined correspondingly to the degree of halation, and is designed in advance so as not to make an incorrect gloss detection.

Therefore, in the result of the calculation for the binarization, the glossy area at G(n, m) and the non-glossy area can be identified, as in the image of the document P illustrated in section (d) in FIG. 6.

If the amount of data stored in the memory 37 becomes huge and it takes a long time to store and to make calculations upon acquiring the images, the images may be applied with compression or the like, within a range not degrading the detection precision.

Because the scanned surface of the document P is bent when an image is scanned at the gloss detecting position, the RGB line pitch in the CCD 30 in the halation image thus acquired is represented as wider than that in a normal image.

Therefore, for a halation image, the gloss detecting unit 35 performs the calculation using reading timing for correcting a line pitch corresponding to a bent document, instead of the reading timing for the normal line pitch correction.

Because the degree by which the line pitch widens depends on the optical system provided to the automatic document feeder, and the shape and the configuration of the CCD 30, the reading timing is determined at the designing stage, in the same manner as the position at which halation is produced.

The CPU 38 then outputs the information of the glossy area detected by the gloss detecting unit 35 in a form of an image, a table, or the like representing the position information of the glossy area, in a manner suitable for its applications.

Equations used in the calculation are listed below:

$$P(n, m) = (D(n, m) + P0(D(n, m))) - H(n, m)$$

P(n, m): a result of a reflection level difference calculation performed on a pixel at the n-th pixel in the main-scanning direction in the m-th line in the sub-scanning direction.

D(n, m): a reflection level at the n-th pixel in the main-scanning direction in the m-th line in the sub-scanning direction (in the normally scanned image without halation)

H(n, m): a reflection level at the n-th pixel in the main-scanning direction in the m-th line in the sub-scanning direction (in the scanned image with halation)

P0(X): a linearity difference for a pixel with the reflection level X, where such a difference is attributable to the difference in the optical systems, and is extracted from a pre-acquired special non-glossy chart.

When $|P(n, m)| \geq |\alpha \times D(n, m)|$, G(n, m)=1 (glossy pixel)
When $|P(n, m)| < |\alpha \times D(n, G(n, m)|$=0 (non-glossy pixel)

G(n, m): a result of gloss determination for the n-th pixel in the main-scanning direction in the m-th line in the sub-scanning direction $\alpha$: a threshold correcting coefficient that is determined correspondingly to the degree of halation It is then determined if the scanning of all of the documents is completed (Step S16). If the scanning of all of the documents is not completed yet (No at Step S16), the system control returns to the beginning and repeats the process. For the remaining scanned document as well, when the gloss detecting scanning is to be applied, the documents are conveyed sequentially, in the same manner as the normal sheet-through scanning for a plurality document sheets, and a glossy area and a non-glossy area are determined for each of the documents.

If it is determined that the scanning of all of the documents is completed (Yes at Step S16), the carriage is returned to the home position from the gloss detecting position (Step S17), and the current gloss detecting process is ended.

The process explained above is achieved by the image reading device 1 including the automatic document feeder 2 having both the CIS 15 and the document reversing mechanism 16. However, the present invention is also applicable to an image reading device including an automatic document feeder not having any CIS 15.

Explained now is an example in which the CIS 15 and the image reading function of the CIS 15 are not used in the image reading device 1 illustrated in FIG. 2. Such an example is explained as a replacement of an explanation of an example in which an image reading device including an automatic document feeder without any CIS is used.

Figure 4:
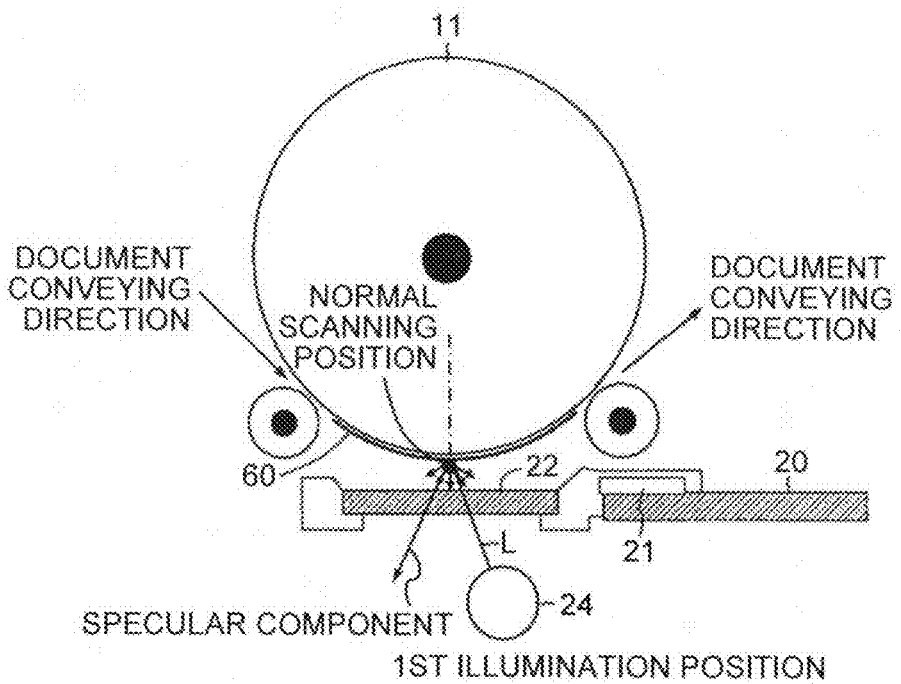
FIG. 4 is an enlarged view of the part near the carriage drum and the light source provided to the image reading device illustrated in FIG. 2.
Figure 8A:
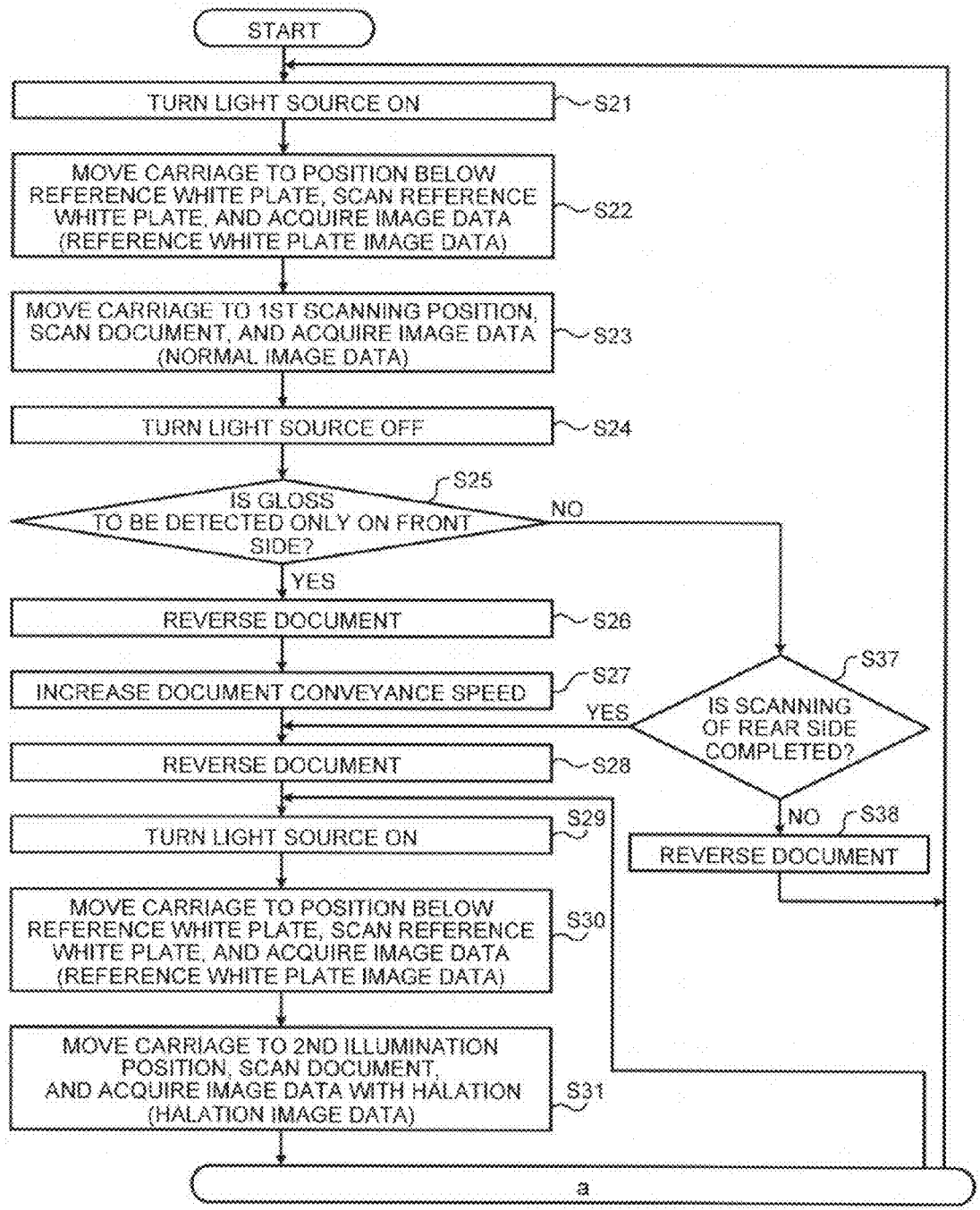
FIGS. 8A and 8B are flowcharts illustrating another gloss detecting process performed by the processing unit illustrated in FIG. 1.
Figure 8B:
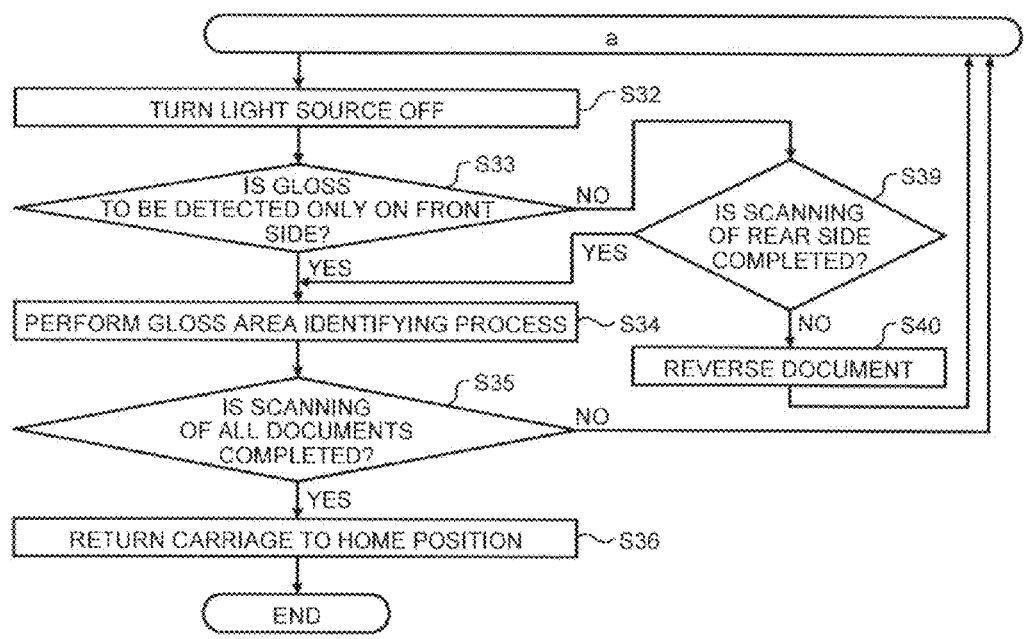

FIG. 4 is an enlarged view of the part near the carriage drum 11 and the light source 24 provided to the image reading device 1 illustrated in FIG. 2. FIGS. 8A and 8B are flowcharts illustrating another gloss detecting process performed by the processing unit 32 illustrated in FIG. 1.

As illustrated in FIGS. 8A and 8B, when the CPU 38 illustrated in FIG. 1 receives an instruction for gloss detecting scanning via a user instruction or automatic start, the CPU 38 turns ON the light source 24 illustrated in FIG. 2, in the same manner as for normal scanning (Step S21), moves the first carriage (referred to as a "carriage" in FIG. 5) 23 illustrated in FIG. 2 to a position below the reference white plate 21, performs the scanning of the reference white plate 21, and acquires the image data of the reference white plate 21 (reference white plate image data) (Step S22).

The carriage is then moved to the normal scanning position in the same manner as in the normal scanning, and the light source 24 illustrated in FIG. 2 is caused to move to the normal scanning position, which is the first illumination position not resulting in halation caused by the light output to the scanned surface. The front side of the document P is then scanned, and the image data (normal image data) without halation is acquired (Step S23).

When the document P is then conveyed, the backing plate 60 having a curved surface illustrated in FIG. 3 causes the scanned surface of the document P (front side) to bend in the sub-scanning direction with respect to the light output from the light source 24. By irradiating the document P with light in this condition, the specular component of the reflection is increased, and halation is produced depending on the illumination position. However, if the normal scanning position of the backing plate 60 having a curved surface is irradiated with the light L from the light source 24, as illustrated in FIG. 4, because the image is scanned at a position where the document sheet glass 22 and the document P extend in parallel, no halation is produced.

After the document P is passed, the light source 24 is turned OFF (Step S24). It is then determined if the gloss detection is to be performed only for the front side (Step S25).

If the gloss detection is not to be performed only for the front side of the document P (No at Step S25), it is determined if the scanning of the rear side is completed (Step S37). If the scanning of the rear side is completed (Yes at Step S37), the system control goes to Step S28. If the scanning of the rear side is not completed (No at Step S37), the document P is conveyed into the document reversing mechanism 16 positioned before the discharging port, and the document reversing mechanism 16 is caused to reverse the document P (Step S38). The rear side of the document P is then scanned at Step S21 to S25, and the image data without halation (normal image data) is acquired.

If the gloss detection is to be applied only for the front side of the document P (Yes at Step S25), the document P is conveyed into the document reversing mechanism 16 positioned before the discharging port, and the document reversing mechanism 16 is caused to reverse the document P (Step S26). At this time, because the document is conveyed only to reverse the document from the front side to the rear side, the CPU 38 illustrated in FIG. 1 sends a controlling signal to the scanner motor 31 to increase the speed at which the document is conveyed, within a range not damaging the document P, only for this time period so that the productivity is maintained (Step S27).

The document P is then reversed (Step S28), and scanning is performed again on the front side. The light source 24 is turned ON, in the same manner as described above (Step S29), and the first carriage (referred to as a "carriage" in FIG. 5) 23 illustrated in FIG. 2 is moved to the position below the reference white plate 21, caused to scan the reference white plate 21, and the image data of the reference white plate 21 is acquired (reference white plate image data) (Step S30).

The carriage is then moved to move the light source 24 illustrated in FIG. 2 to the second illumination position resulting in halation caused by the light output to the scanned surface (front side of the document). When the document P is then fed, the backing plate 60 illustrated in FIG. 3 having a curved surface causes the scanned surface (front side) of the document to bend in the sub-scanning direction with respect to the light output from the light source 24. By irradiating the document P with light in this condition, the specular component of the reflection from a glossy area of the scanned surface is increased. In this manner, image data with halation is acquired (halation image data, front side halation image data, in this example) (Step S31).

The light source 24 illustrated in FIG. 2 is then turned OFF (Step S32), and it is determined if the gloss detection is to be performed only for the front side (Step S33).

If the gloss detection is not to be performed only for the front side (No at Step S33), it is determined if the scanning of the rear side is completed (Step S39). If the scanning of the rear side is completed (Yes at Step S39), the system control goes to Step S34. If the scanning of the rear side is not completed (No at Step S39), document P is fed into the document reversing mechanism 16 positioned before the discharging port, and the document reversing mechanism 16 is caused to reverse the document P (Step S40). The rear side of the document P is then scanned at Step S29 to S33, and image data with halation is acquired (halation image data, halation image data of the rear side, in this example).

If the gloss detection is to be performed only for the front side of the document P (Yes at Step S33), and if reading of an image of the rear side is completed (Yes at Step S39), the glossy area identifying process is then performed (Step S34). Because the glossy area identifying process performed at Step S34 is the same as that performed at Step S15 described above, an explanation thereof is omitted herein.

For the glossy area identifying process performed at Step S34 as well, the CCD 30 is caused to read a specific gray scale chart (non-glossy chart) at the gloss detecting position in advance, during manufacturing or processing process of the image reading device 1. A scanned image at the normal scanning position and the scanned image at the gloss detecting position are then acquired, and an output on each of the images corresponding to certain reflectance (e.g., at 20-point), as illustrated in FIG. 7, is stored in the memory 37 provided to the gloss detecting unit 35 in advance.

It is then determined if the scanning of all of the documents is completed (Step S35). If the scanning of all of the documents is not completed yet (No at Step S35), the system control returns to the beginning and repeats the process. If the scanning of all of the documents is completed (Yes at Step S35), the carriage is returned to the home position from the gloss detecting position (Step S36), and the current gloss detecting process is ended.

In the manner described above, because the number of times the operation of reversing the document is performed is increased, the productivity is reduced compared with an automatic document feeder provided with the CIS 15, in addition to the document reversing mechanism 16. However, this configuration allows an automatic document feeder without any CIS to identify a glossy area by performing scanning a plurality of times in response to a single job automatically.

In the image forming apparatus according to the embodiment, the image reading device enables a pattern formed with a gloss to be detected correctly using a current mechanical configuration, while suppressing a scale increase of the system, as well as a cost increase of the apparatus.

Furthermore, because the backing plate, which comes to a position directly above the surface to be scanned when the document is fed, has a curved shape, a document to be scanned is allowed to be scanned while the document is bent intentionally, halation can be produced in an image reliably.

Furthermore, during the sheet-through conveyance of a document along the curved surface of the backing plate, the carriage is moved to a position producing halation, and the scanning is performed at that position. Therefore, an image with halation can be acquired reliably.

Furthermore, in order to identify a glossy portion and a non-glossy portion of a document, it is necessary to acquire an image resulting from normal scanning as well as an image with halation, for the purpose of comparison. Because the CIS and the document reversing mechanism are used to acquire scanned image data with halation as well as image data normally scanned by the CIS from the same document, these two images can be acquired in response to a single job, without causing a user to issue a scanning job twice.

Furthermore, in order to identify a glossy portion and a non-glossy portion of a document, it is necessary to acquire an image resulting from normal scanning as well as an image with halation. The document reversing mechanism can reverse the document a plurality of times, without using a CIS, to acquire scanned image data with halation as well as normally scanned image data from the same document. In this manner, these two images can be acquired in response to a single job, without causing a user to issue a scanning job twice.

A conventional document feeder temporarily increases a conveying speed between where the document is reversed and where the document is scanned. When the gloss detection is to be performed only on the front side, the document reversing mechanism reverses the document twice in order to feed the document again on the front side. However, because the document is merely conveyed without being scanned for a period between the first reversal and the second reversal, the speed at which the document is conveyed can be increased during this period, in order to maintain the productivity, within a range not damaging the document.

Furthermore, because the document is scanned while the document is bent to a position further away from the position used in the normal scanning, the RGB line pitch on the resultant image is increased, compared with that resulting from normal scanning.

The line pitch is corrected using a normal memory or the like. For the scanning to achieve an image with halation, the correction settings are automatically switched for those for an image with halation. In this manner, a line offset can be corrected.

Furthermore, by calculating a difference between the image with halation and a normal image, the difference between these images, that is, a portion with halation can be detected. In this manner, detection can be made as to which portion is a glossy portion.

Furthermore, when the image reading device is caused to scan a document for the difference calculation, because different optical systems are used in the reading by the CIS and in the reading at the gloss detecting position via the shrinking optical system, there is a difference in the reflectance-to-output characteristic (linearity) even for the same document. Therefore, precision of determining a glossy portion and a non-glossy portion is reduced unless such a difference is taken into account in the result of the difference calculation for the gloss detection.

In response to this issue, the precision of the gloss detection can be increased by scanning a specific non-gloss chart with the CIS and at the gloss detecting position, outputting a difference in linearity of the respective optical systems, and storing such a difference in the memory provided to the gloss detecting unit.

Furthermore, when the image reading device is caused to scan a document for the difference calculation, because different optical systems are used in scanning at the normal scanning position and in scanning at the gloss detecting position, there is a difference in the reflectance-to-output characteristic (linearity) even for the same document. Therefore, precision of determining a glossy portion and a non-glossy portion is reduced unless such a difference is taken into account in the result of the difference calculation for the purpose of gloss detection.

In response to this issue, the precision of the gloss detection can be increased by scanning a specific non-gloss chart at the normal scanning position and at the gloss detecting position, outputting a linearity difference between the respective optical systems, and storing such a difference in the memory provided to the gloss detecting unit.

The gloss detection is explained so far. The image reading device 1 having such a gloss detection function can achieve additional functions using the gloss detection function.

A first example to a sixth example having a glossy information processing unit as such an additional function will now be explained.

FIRST EXAMPLE

To begin with, the first example will be explained.

In the first example, the image reading device 1 detects a glossy portion formed with a clear toner in a document scanned in the manner described above, and identifies addressee information from a gloss detection image that is a result of the detection. An image of the document without halation acquired through the normal scanning is then transmitted via a facsimile or an email to the addressee (hereinafter, these are referred to as "automatic addressee detection transmission"). In this manner, a user operation entering an addressee on the operating unit can be omitted, and an erroneous transmission caused by an incorrect addressee can be prevented. The addressee information may be a numeric image or a character image in which the numbers or the characters (e.g., alphabets) of the addressee are printed with a clear toner as they are, or may be that printed as code information that a user cannot visually recognize, e.g., a barcode or a QR code (registered trademark), using a clear toner. Formation of the addressee information using a clear toner will be explained later.

Figure 11:
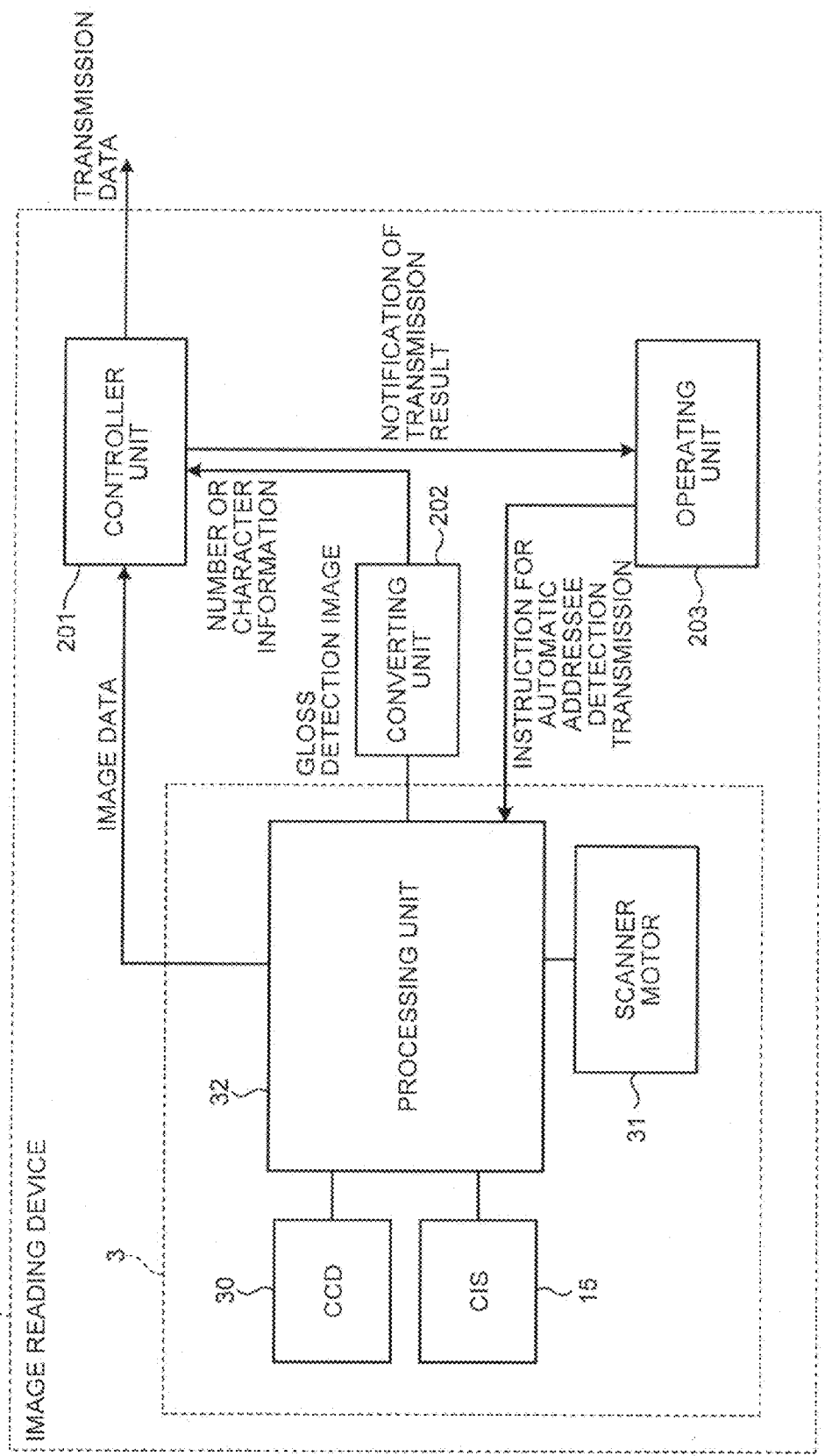
FIG. 11 is a block diagram illustrating an exemplary configuration of a control system providing a function of automatic addressee detection transmission of the image reading device 1 illustrated in FIG. 2.

FIG. 11 is a block diagram illustrating an exemplary configuration of a control system providing the function of the automatic addressee detection transmission of the image reading device 1 illustrated in FIG. 2.

The image reading device 1 includes a controller unit 201, a converting unit 202, and an operating unit 203, in addition to the scanning unit 3 including the CIS 15, the CCD 30, the processing unit 32, and the scanner motor 31 illustrated in FIG. 1.

The controller unit 201 includes a CPU and an application specific integrated circuit (ASIC) for executing calculations and image processing to an image (image data) or information received from the processing unit 32 in the scanning unit 3. The controller unit 201 has a function of an image acquiring unit that acquires an image to be formed on a transfer sheet.

The converting unit 202 is provided with a CPU in which software having an optical character recognition (OCR) or a decoder is embedded.

The OCR is provided to, when the gloss detection image is a numeric image or a character image, covert the gloss detection image received from the processing unit 32 into number or character information being number or character information.

The decoder is provided to, when the gloss detection image is code information, convert the gloss detection image received from the processing unit 32 into number or character information. The decoder may be a conversion table storing therein a mapping relation between code information and number or character information.

As mentioned above, when the gloss detection image representing the addressee information is an image of numbers or characters, a conversion process using the OCR (OCR process) is performed. When the gloss detection image is code information, a conversion process using the decoder is performed.

The operating unit 203 is an information receiving unit including an input unit that receives inputs of various types of information entered by a user, a display unit that displays information to a user, and a CPU that controls the entire operating unit 203. An external operating unit may also be used.

Figure 12:
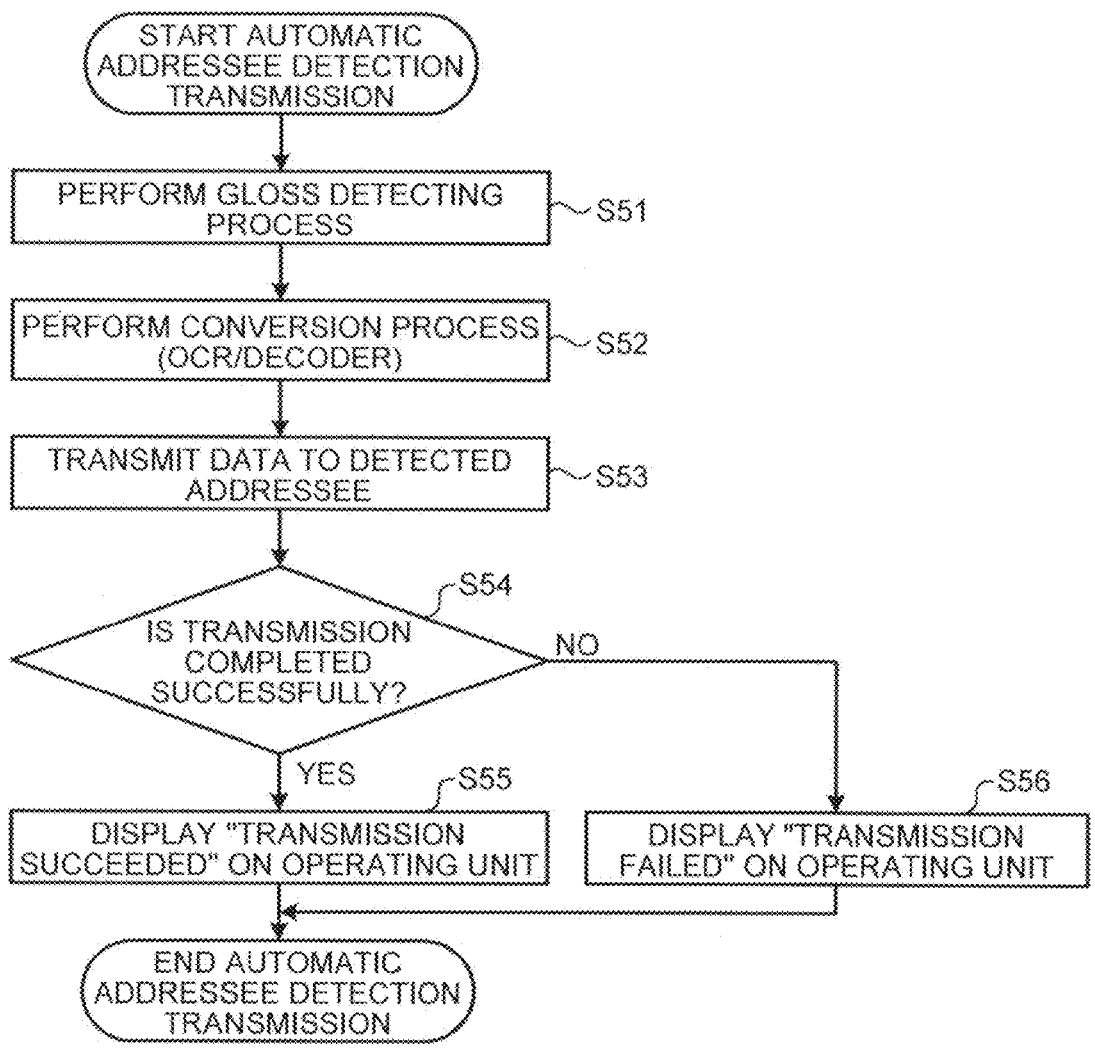
FIG. 12 is a flowchart illustrating an example of an automatic addressee detection transmission process performed by each of the units provided to the image reading device 1 illustrated in FIG. 11.

FIG. 12 is a flowchart illustrating an example of an automatic addressee detection transmission process performed by each of the units provided to the image reading device 1 illustrated in FIG. 11. This function of the automatic addressee detection transmission process corresponds to a function of a transmitting unit that transmits an image (a normal image) of a document scanned through the first scanning to an addressee represented by a glossy portion of the scanned document detected by the gloss detecting unit 35.

When a user gives an instruction for the automatic addressee detection transmission via the operating unit 203, the processing unit 32 receives the instruction, and starts the process illustrated in FIG. 12. To begin with, the gloss detecting process (gloss detecting scanning), explained with reference to FIG. 5 or FIGS. 8A and 8B, is performed to a document to be scanned on which addressee information is formed with a clear toner (Step S51).

Once the gloss detecting process is completed, the processing unit 32 outputs the result of detecting a glossy portion (portion representing the addressee information) formed with a clear toner, such as one illustrated in FIG. 6C, to the converting unit 202 as a gloss detection image. The converting unit 202 acquires the gloss detection image and converts the gloss detection image into number or character information through the conversion process using the OCR or the decoder (Step S52).

The number or character information thus converted is sent to the controller unit 201. The controller unit 201 then detects the number or character information as addressee information, sets the addressee, and transmits a normal image (image data) of the scanned document received from the processing unit 32 to the addressee over a communication circuit such as a local area network (LAN) or the Internet not illustrated (Step S53). When the conversion process can be executed by the CPU provided to the controller unit 201, the CPU may be caused to execute the conversion process using the OCR or the decoder, as well as setting of the addressee altogether.

It is then determined if the transmission to the addressee is completed successfully. If the transmission is completed successfully, the operating unit 203 is notified of the transmission result, and a message of "transmission succeeded" is displayed on the operating unit 203 (Step S54 and S55).

If the transmission to the addressee fails, the operating unit 203 is notified of the transmission result, and a message of "transmission failed" is displayed on the operating unit 203 (Step S56). When the OCR or the decoder is incapable of detecting any characters in the conversion process, or when an unused addressee is designated, as well as when a data transmission has failed due to disconnection or when a transmission error has occurred because the addressee number is not used, it is also preferable to display the message "transmission failed" on the operating unit 203, in the same manner as conventionally practiced.

Once the process at Step S55 or S56 is completed, the process illustrated in FIG. 12 is ended.

SECOND EXAMPLE

The second example will now be explained.

In the second example, the image reading device 1 determines the authenticity of a document by detecting an identification (ID) information represented in a glossy portion that is formed with a clear toner in a document scanned in the manner described above. The "ID information" is number or character information that is number or character information similar to the addressee information but indicating a person having printed the document or date on which the document is printed, or encoded code information such as a barcode that is not visually legible. Formation of the ID information with a clear toner will be explained later, in the same manner as formation of the addressee information. Any information other than the ID information may also be used as long as the information can determine the authenticity of a document.

Figure 13:
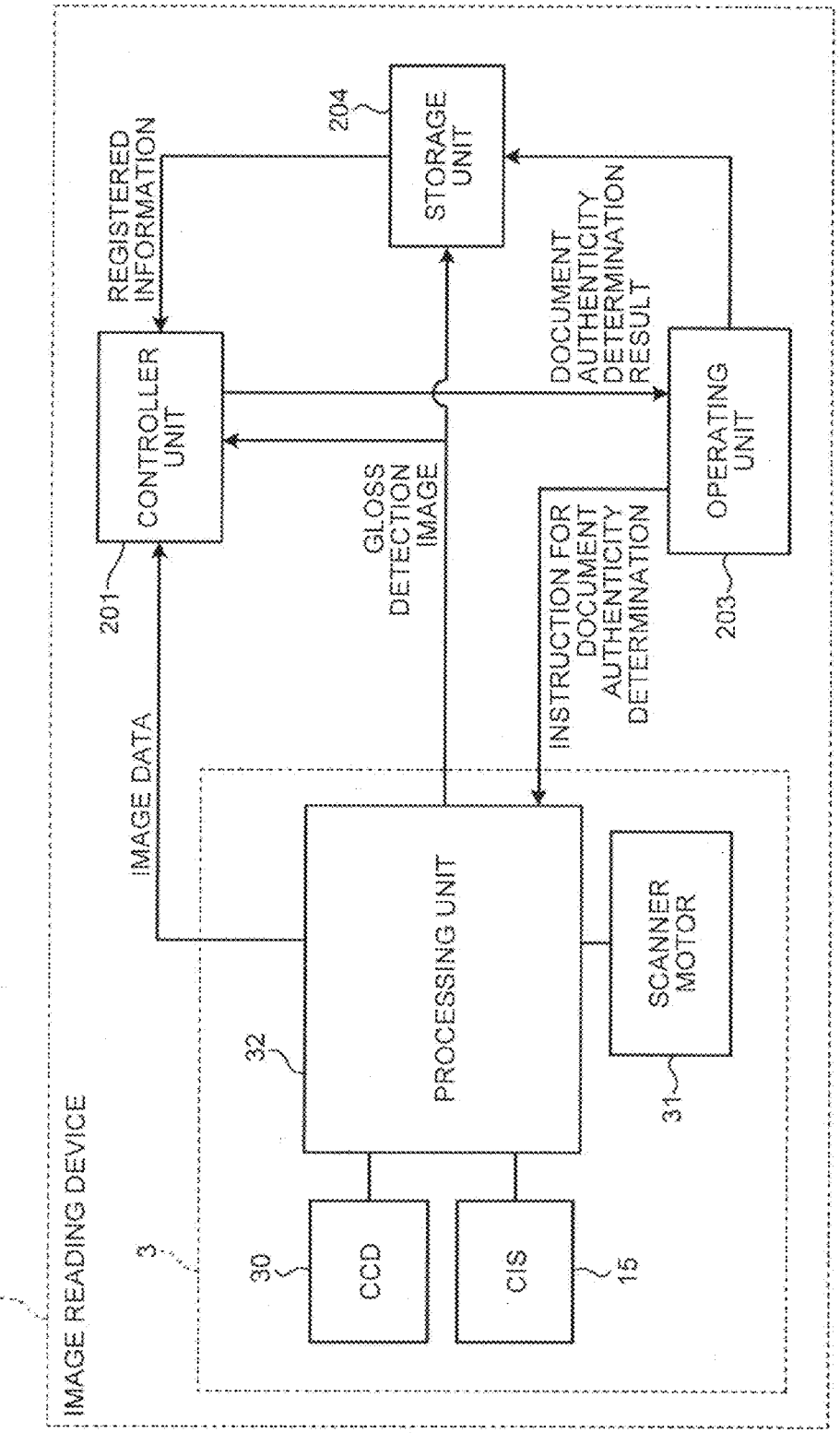
FIG. 13 is a block diagram illustrating an exemplary configuration of a control system providing a document authenticity determining function of the image reading device 1 illustrated in FIG. 2.

FIG. 13 is a block diagram illustrating an exemplary configuration of a control system providing a document authenticity determining function of the image reading device 1 illustrated in FIG. 2. The portions corresponding to those in FIG. 11 are assigned with the same reference numerals, and explanations thereof are omitted herein.

The image reading device 1 includes the controller unit 201, the operating unit 203, and a storage unit 204 in addition to the scanning unit 3 including the CIS 15, the CCD 30, the processing unit 32, and the scanner motor 31 illustrated in FIG. 1.

The storage unit 204 is a nonvolatile storage unit such as a flash memory or a hard disk drive storing therein registered information, which is described later.

The user giving ID information to a document to be scanned enters the same ID information via the operating unit 203, and stores the information in the storage unit 204.

Figure 14:
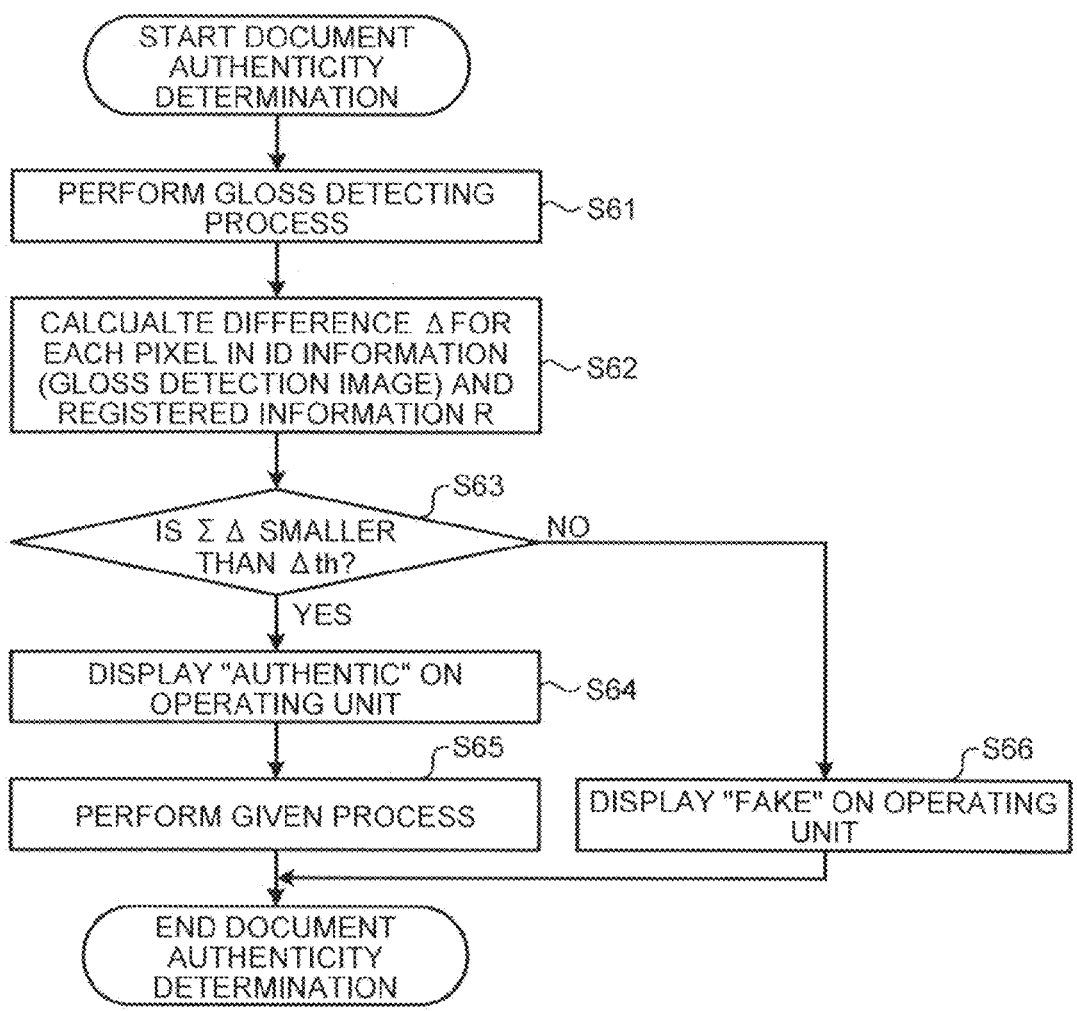
FIG. 14 is a flowchart illustrating an example of a document authenticity determining process performed by each of the units provided to the image reading device 1 illustrated in FIG. 13.

FIG. 14 is a flowchart illustrating an example of a document authenticity determining process performed by each of the units provided to the image reading device 1 illustrated in FIG. 13. This function of the document authenticity determining process corresponds to a function of an authenticity determining unit that determines the authenticity of a scanned document based on identification information represented in a glossy portion of the scanned document detected by the gloss detecting unit 35.

When a user gives an instruction for document authenticity determination via the operating unit 203, the processing unit 32 receives the instruction, and starts the process illustrated in FIG. 14. To begin with, the gloss detecting process explained with reference to FIG. 5 or FIGS. 8A and 8B is performed to a document to be scanned provided with ID information with a clear toner (Step S61).

Once the gloss detecting process is completed, the processing unit 32 outputs a gloss detection image indicating ID information formed with a clear toner to the controller unit 201. The controller unit 201 acquires the gloss detection image, and determines the authenticity of the document by comparing the ID information represented in the gloss detection image with the registered information stored in the storage unit 204 (Step S62, S63). At this time, the converter in the controller unit 201 (that is equivalent to the converting unit 202 illustrated in FIG. 11) performs the conversion that is the same as that according to the first example. A specific example of the document authenticity determination will be provided later.

If the ID information represented in the gloss detection image thus acquired matches the registered information, the document is determined to be authentic. The operating unit 203 is then notified of the document authenticity determination result, and the result is displayed on the operating unit 203 (Step S64).

The user looking at the information thus displayed then selects a given process (e.g., printing or transmission) via the operating unit 203, and the controller unit 201 receives the selection, and executes the process thus selected (Step S65). Examples of the process include printing (copying), transmitting, and storing the image data read from the scanned document received from the processing unit 32.

By contrast, when the gloss detecting process is performed to a document not provided with any ID information, e.g., a document copied by a user who does not have permission and is not a user who provided the ID information through normal scanning, because the document has no ID information and there is no information matching the registered information, the document is determined to be fake. In such a case, the operating unit 203 is notified of the result of the document authenticity determination, and a message of "fake" is displayed on the operating unit 203 (Step S66). When the gloss detecting process is performed to a document not provided with correct ID information, e.g., a document printed by a user without knowing (not capable of printing) the registered information, because there is no information matching the registered information, a message of "fake" is displayed on the operating unit 203 in the same manner.

Once the process at Step S65 or S66 is completed, the process illustrated in FIG. 14 is ended.

A specific example of the document authenticity determination performed at Step S62 and S63 in FIG. 14 will now be explained.

Figure 15B:
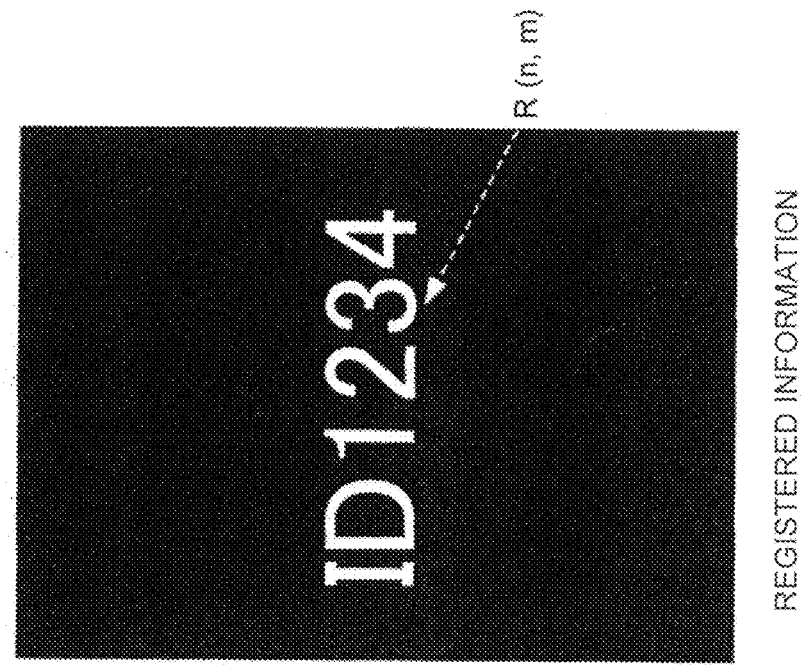
FIGS. 15A and 15B are schematics of examples of images for explaining pixel values detected at the respective coordinates to perform document authenticity determination.
Figure 15A:
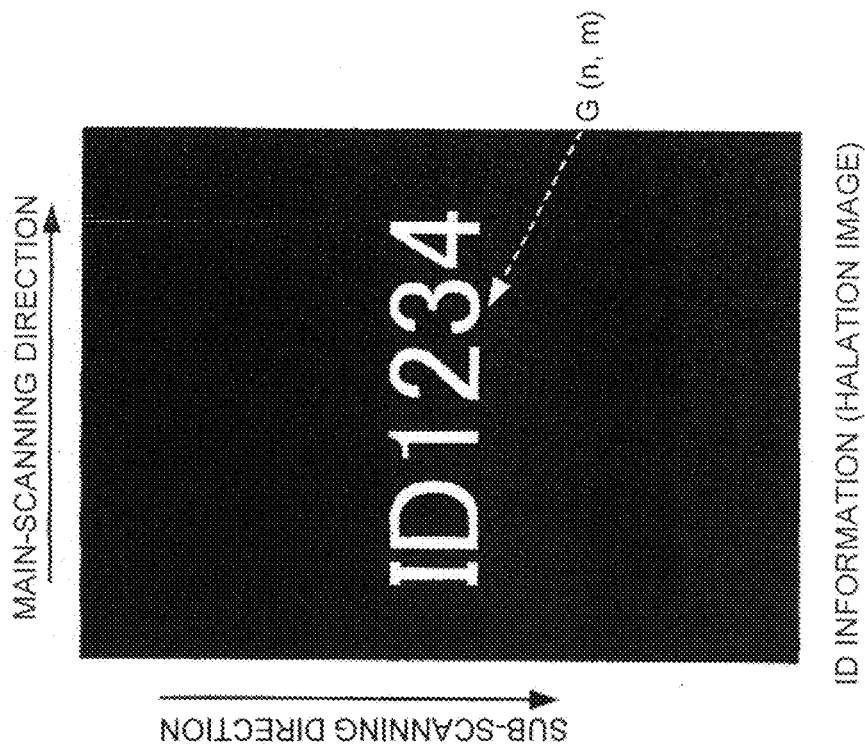

FIGS. 15A and 15B are schematics of examples of images for explaining pixel values detected at the respective coordinates to perform document authenticity determination.

The controller unit 201 acquires a difference $\Delta(n, m)$ between a value detected at a coordinate $G(n, m)$ in an image having ID information represented in an acquired gloss detection image (ID information after the conversion process), e.g., the ID information "ID1234" represented in the gloss detection image formed with a clear toner illustrated in FIG. 15A, and a value at the same coordinate $R(n, m)$ in the registered information illustrated in FIG. 15B (Step S62).

It is then determined if the sum of the differences $\Sigma\Delta$ is less than a predetermined threshold $\Delta$th (Step S63). If the sum is less than the threshold $\Delta$th, the document is determined to be authentic. If the sum is equal to or more than the threshold $\Delta$th, the document is determined to be fake. The document authenticity determination result is then displayed on the operating unit 203. As the threshold $\Delta$th, a value corresponding the characteristics (reading error, environmental changes) of the image reading device is stored and set in the storage unit 204.

Equations used in the calculations are as listed below:

$$\Delta(n, m) = |G(n, m) - R(n, m)|$$

$G(n, m)$: a level at the coordinates (n, m) in a gloss detection image (0 or 1)

$R(n, m)$: a level at the coordinates (n, m) in a registered information (0 or 1)

$\Delta(n, m)$: a difference between the gloss detection image and the registered information at the coordinate (n, m)

$\Sigma\Delta$: the sum of the differences in all of the pixels $\Delta$th: a threshold for the sum of the differences used in determining the authenticity with respect to the registered information (<$\Delta$th: authentic, $\geq\Delta$th: fake)

Instead of conducting a comparison at every coordinate, the ID information may be compared with the registered information in the storage unit 204 after applying the OCR or the decoding process to the gloss detection image, in the same manner as in the first example, and converting the information into character and numeric information. In such a case, the registered information, too, is registered as character and numeric information in the storage unit 204.

Explained above are examples of an additional function provided by the image reading device 1. An additional function may also be provided through the image forming function of the image forming apparatus 100 including the image reading device 1. In the third example to the sixth example, examples of such an additional function will be explained.

Recently having put in practical use is a printer using a transparent and glossy medium. In the third example to the sixth example, it is assumed that the imaging unit including the photosensitive drum 44 and the developing unit 45 illustrated in FIG. 2 is actually configured to be capable of executing image formation using a clear toner across the entire surface of a transfer sheet, as well as image formation using four color toners of cyan (C), magenta (M), yellow (Y), and black (K), for example.

For example, the imaging unit includes five photosensitive drums 44, five developing units 45, and the like, and an intermediate transfer belt. The five electrostatic latent images formed on the respective five photosensitive drums 44 are developed in the five toners (including the clear toner) in the respective color planes. A color image is then formed by sequentially transferring the toner images in each of the color planes onto the intermediate transfer belt in a manner superimposed over one another. Alternatively, the imaging unit may include a photosensitive drum 44, a developing unit 45, and an intermediate transfer belt. In such a configuration, five electrostatic latent images sequentially formed on the photosensitive drum is sequentially developed in units of the color planes using five toners, and a color image is formed by sequentially transferring the toner image in each of the color planes onto the intermediate transfer belt in a manner superimposed over one another. Alternatively, the image forming apparatus may be provided with a photosensitive belt instead of the photosensitive drum, and with an intermediate transfer drum instead of the intermediate transfer belt.

THIRD EXAMPLE

To begin with, the third example will be explained.

Figure 16:
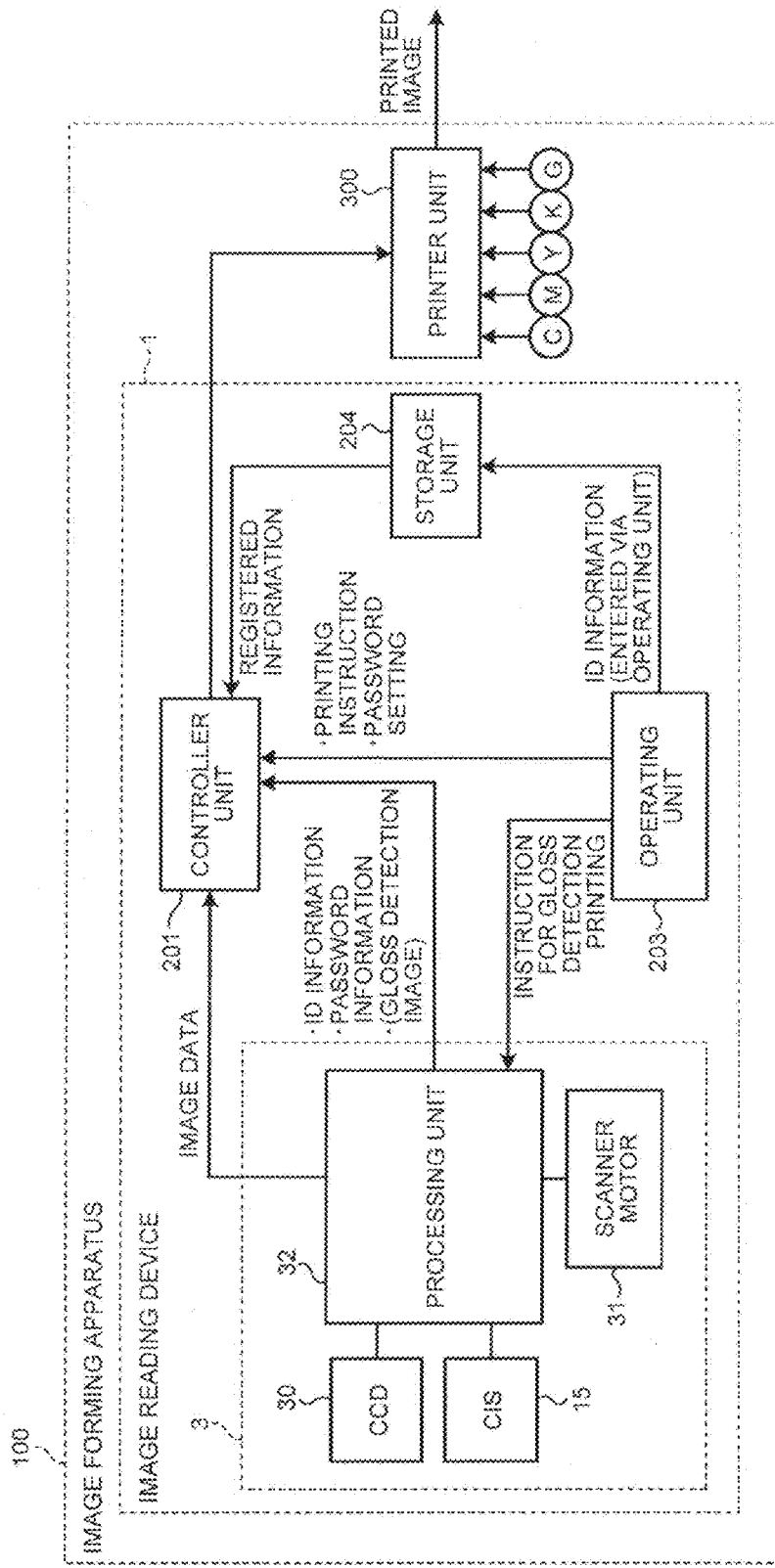
FIG. 16 is a block diagram illustrating an exemplary configuration of a control system of the image forming apparatus 100 illustrated in FIG. 2.

FIG. 16 is a block diagram illustrating an exemplary configuration of a control system of the image forming apparatus 100 illustrated in FIG. 2. The portions corresponding to those in FIG. 13 are assigned with the same reference numerals, and explanations thereof are omitted herein.

The image forming apparatus 100 is provided with a printer unit 300 including an imaging unit that performs the actual printing, in addition to the image reading device 1 described above. The printer unit 300 is assigned with a channel for a gloss (G) toner as a clear toner, in addition to the C toner, the M toner, the Y toner, and the K toner.

The controller unit 201 has a function of an image formation control unit that causes the printer unit 300 to form an image of a scanned image, with an addition of a glossy portion representing information received by the operating unit 203.

FIGS. 17A to 17D are schematics of examples of images for explaining data separation performed when the image forming apparatus 100 illustrated in FIG. 16 duplicates (copies) an image of a document including a glossy portion.

Figure 17:
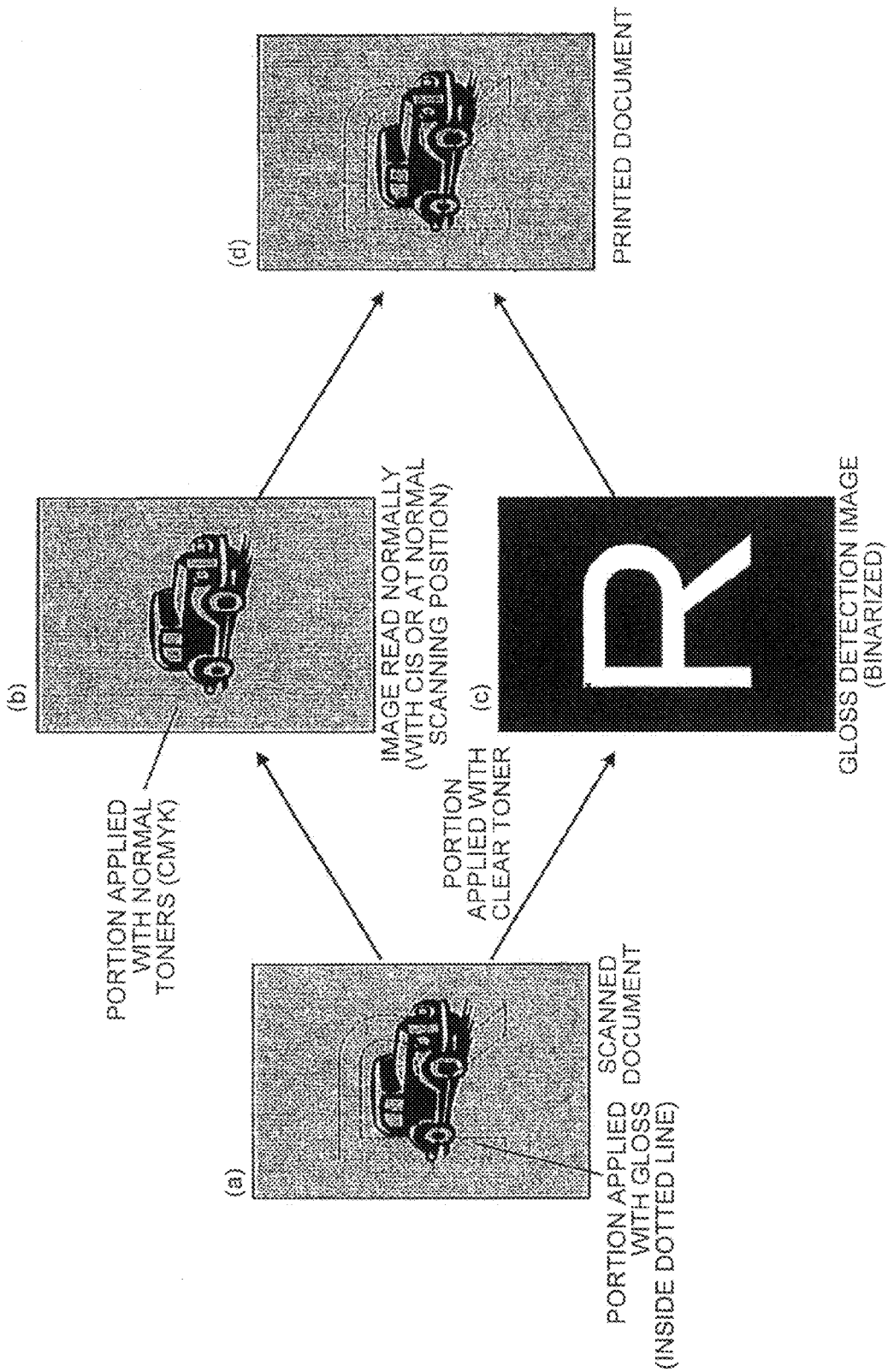
FIGS. 17A to 17D are schematics of examples of images for explaining data separation performed when the image forming apparatus 100 illustrated in FIG. 16 duplicates (copies) an image of a document including a glossy portion.

In the third example, the processing unit 32 in the image reading device 1 performs the gloss detecting process described above to a document on which a glossy portion is partially formed with a clear toner, as illustrated in FIG. 17A, and that is read in the manner described above. As a result, a normally scanned image, illustrated in FIG. 17B, which is to be applied with normal toners (C, M, Y, and K), and the gloss detection image illustrated in FIG. 17C are transmitted to the printer unit 300 via the controller unit 201. The gloss detection image illustrated in FIG. 17C is an image representing a result of detecting a glossy portion, which is detected by comparing the normally scanned image without halation and the scanned image with halation.

The printer unit 300 corresponds to an image forming unit that forms an image including a gloss detection image (glossy portion) on a transfer sheet (sheet medium). Upon receiving the normally scanned image and the gloss detection image, the printer unit 300 applies the normal toners based on the normally scanned image, and also applies a clear toner to the glossy portion represented by the gloss detection image, via the developing process. Through this process, the printer unit 300 can perform printing in which the normal toners and the clear toner are automatically applied to positions that are the same as those in the document to a transfer sheet, as illustrated in FIG. 17D, and output the printout as a duplicate. This printing is hereinafter referred to as "gloss detection printing".

FOURTH EXAMPLE

Figure 18:
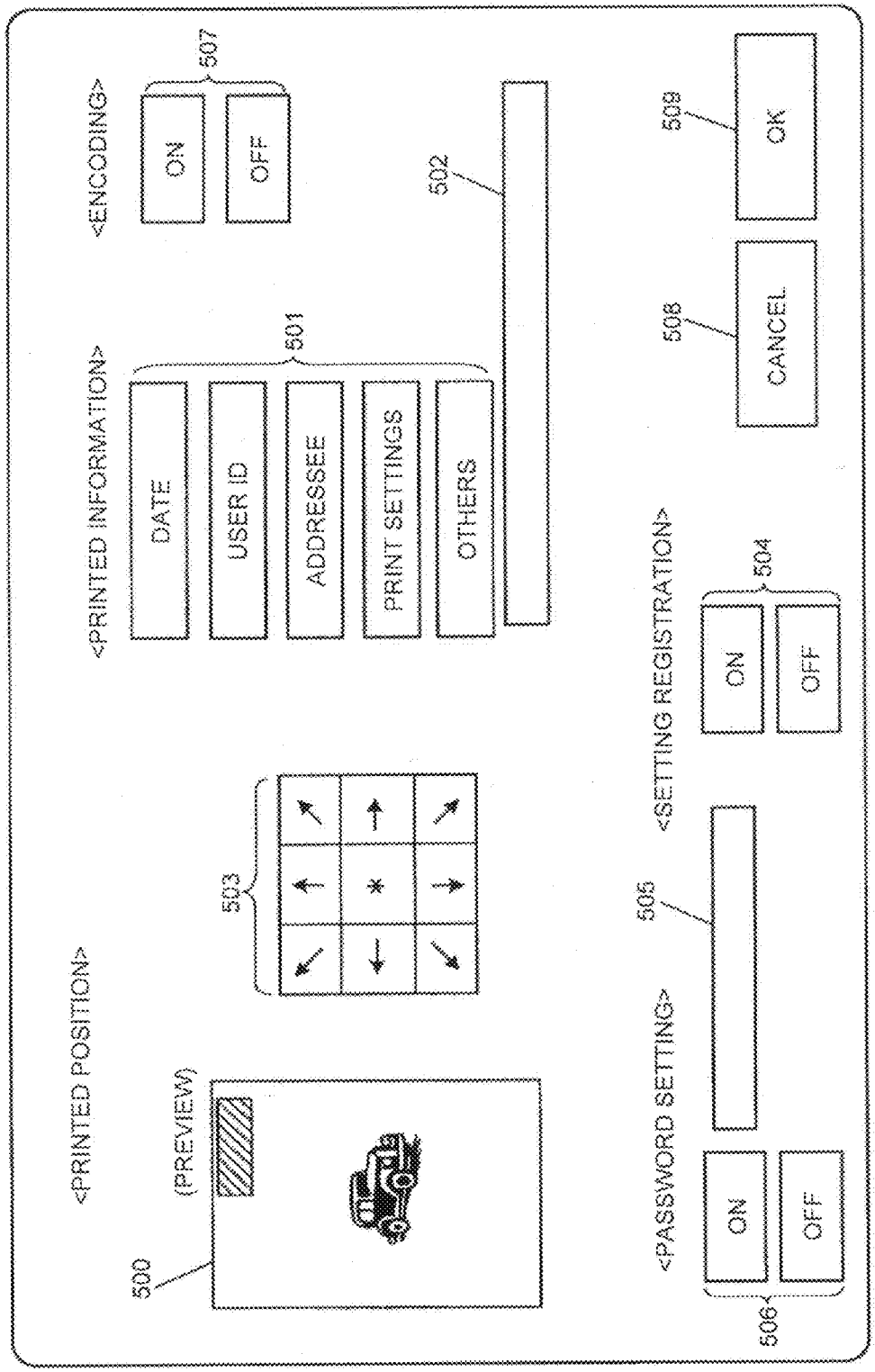
FIG. 18 is a schematic of a layout representing an example of an operation screen displayed on a display unit in an operating unit 203 illustrated in FIG. 16.

The fourth example will now be explained. FIGS. 16 and 18 are also used in the fourth example.

FIG. 18 is a schematic of a layout representing an example of an operation screen displayed on the display unit in the operating unit 203 illustrated in FIG. 16.

In the fourth example, when a new copy of a document is to be created (an image is to be formed), a user who is a person having printed the document can designate any addressee information, ID information, or the like described above via the operating unit 203.

In such a case, the user causes the operation screen illustrated in FIG. 18 to be displayed on the display unit via an operation performed on the operating unit 203.

Displayed in the operation screen are a preview section 500, printing function keys 501, an information textbox 502, direction keys 503, setting registration keys 504, password textbox 505, password setting keys 506, encoding keys 507, a cancel key 508, and an OK key 509.

The preview section 500 is capable of displaying an image read from a document and expanded onto the RAM in the controller unit 201 (scanned image) as a preview image (print image). The preview image may include information to be printed (content to be printed) by a designated printing function, which is described later.

The printing function keys 501 are provided for selectively designating each of printing functions for printing information such as date information, user ID, addressee information, or print setting information (which is described later).

The information textbox 502 is a textbox for entering information to be printed (content to be printed) by a printing function designated on the printing function key 501 via an operation performed on the input unit provided to the operating unit 203.

The direction keys 503 are provided for moving the position of the information to be printed by a designated printing function (printing position) in the preview image to particular directions.

The setting registration keys 504 are provided for registering information specified in the operation screen and for cancelling the registration.

The password textbox 505 is a textbox for entering a password, which is a type of authentication information, via an operation performed on the input unit provided to the operating unit 203. Any authentication information other than a password may also be used.

The password setting keys 506 are provided for registering a password displayed in the password textbox 505 and permitting a designated function to be executed, and for disabling the registration.

The encoding keys 507 are provided for designating whether information to be printed by the printing function designated by the printing function key 501 is to be encoded or not.

The cancel key 508 is provided for canceling inputs.

The OK key 509 is provided for committing the inputs.

In the fourth example, when a user enters information to be printed by a printing function, which is designated via a printing function key 501, in the information textbox 502 through an operation performed on the input unit provided to the operating unit 203 and selects (presses down) the OK key 509, the CPU in the operating unit 203 commits the input of the information, and displays the information in the preview image. At this time, the information is displayed at a default position to be printed. In FIG. 18, this printing position is displayed as hatched.

Through this operation, the controller unit 201 is allowed to cause the printer unit 300 to print an image including information such as the date information or the user ID designated by the user at the designated position (the position designated by the user) onto a transfer sheet. The controller 20 may also cause the printer unit 300 to print an image including other information such as addressee information or print setting information designated by the user at the designated position as a glossy portion onto a transfer sheet using a clear toner.

A user makes a designating operation on the direction keys 503 to designate the position at which the information is printed. The information thus designated is used when printing with a clear toner is executed to a document. By enabling the setting registration by performing a designating operation on the setting registration key 504 and selecting the OK key 509, the user may also cause the CPU in the operating unit 203 to store (set) and to register such information in the storage unit 204. In this manner, the information can be used in the automatic addressee detection transmission or the document authenticity determination explained above.

Although the addressee information or the ID information to be printed is printed with a clear toner, characters or numbers printed with a clear toner could be legible to human eyes depending on angles, due to the characteristic of a clear toner. When it is desirable to avoid such legibility, a user may select whether to encode the information into a barcode, for example, so that the information is not legible on a resultant document, via a designating operation performed on the encoding key 507.

FIFTH EXAMPLE

The fifth example will now be explained. FIGS. 16 and 18 are also used in the fifth example.

Provided in the fifth example is a password setting function that permits only specific users to duplicate a document to be scanned including a glossy portion formed with a clear toner, when a user attempts to perform the gloss detection printing described above.

FIG. 19 is a flowchart illustrating an example of the gloss detection printing including user authentication performed by each of the units included in the image forming apparatus 100 illustrated in FIG. 16. The function of the gloss detection printing serves as an authentication unit that performs user authentication based on authentication information represented in a glossy portion of the scanned document detected by the gloss detecting unit 35, and permits execution of a process related to the glossy portion detected by the gloss detecting unit 35 only if the user authentication is successful.

When an image formed with a clear toner is to be newly printed, a user who is the person who prints the document enters a password in the password textbox 505 illustrated in FIG. 18 via an operation on the input unit included in the operating unit 203, and stores (sets) the passwords in the storage unit 204. Then an encoded code or the like is added to a document to be scanned with a clear toner. When the code or the like to be added is to be encoded, the encoding key 507 is selected to turn ON the setting registration.

When the user gives an instruction for the gloss detection printing via the operating unit 203, the processing unit 32 receives the instruction, and starts the process illustrated in FIG. 19. To begin with, the gloss detecting process explained with reference to FIG. 5 or FIGS. 8A and 8B is/are performed to the scanned document on which an encoded code or the like is formed with a clear toner (Step S71).

Once the gloss detecting process is completed, the processing unit 32 outputs a gloss detection image representing the encoded code or the like, having formed with a clear toner, to the controller unit 201. The controller unit 201 acquires the gloss detection image, and the converter in the controller unit 201 (that is equivalent to the converting unit 202 illustrated in FIG. 11) converts the code or the like represented in the gloss detection image, based on a conversion process that is the same as that according to the first example, and determines if any password has been set in advance, based on the result of the conversion (Step S72).

If a password has been set, a password entry screen not illustrated is displayed on the display unit in the operating unit 203, and prompts the user to enter the password (Step S73).

If the user enters the password in response to the prompt, the controller unit 201 determines the authenticity of the password (performs user authentication) in which a determination is made as whether the password matches a preset password (password read from the glossy portion represented in the scanned document) (Step S74).

If these passwords match (if the password entered by the user is authentic), because the user authentication has been successful, permission for printing the document including the gloss detection image, which is a process related to the gloss detection image, is granted, and the printing is executed (Step S75).

If these passwords do not match (if the password entered by the user is fake), because the user authentication has failed, normal printing is executed without printing the gloss detection image (Step S76).

In this manner, a user (other user) who is not the user having instructed printing of the document including the ID information and the password formed with a clear toner (person having printed the document) attempts to duplicate the document including the clear toner portion (glossy portion) via the gloss detecting process, such a user is prohibited from making a duplicate including the glossy portion unless the user knows the password. It is also possible not to allow the user to duplicate the image of the document at all when the authentication fails.

When no restriction is to be applied to the duplication, as long as no password has been set and registered in the operation screen illustrated in FIG. 18 when the document is printed, other users are allowed to duplicate the glossy portion freely, without being prompted to enter any password.

Any operation other than copying described above, e.g., outputting a printout, transmitting an image (via an email or a LAN), or storing the image, may be controlled to be permitted or not permitted based on the result of the authentication described above. In such a case, a process applied only to the glossy portion may be controlled, or a process applied to an entire image may be controlled.

SIXTH EXAMPLE

The sixth example will now be explained. FIGS. 16 and 18 are also used in the sixth example.

In the sixth example, in the image forming apparatus 100 including the image reading device 1, print setting information that is setting information used in printing (e.g., color/monochromatic printing, print size, density, orientation, simplex/duplex, and post-process(es)) is instructed on the operation screen illustrated in FIG. 18 before the printing is executed, in the same manner as the addressee information, and the print setting information is formed as a glossy portion with a clear toner when the document is printed. When the printed document is to be duplicated later in time, the gloss detecting process may be performed to automatically read the setting information represented in the glossy portion added when the document is printed, and a duplicate is made based on the print setting information thus read. In this manner, a user operation for entering the print settings can be omitted, and a printing mistake due to incorrect settings can be prevented.

According to the examples explained above, advantageous effects (a) to (g) listed below can be achieved.

(a) Because the image processing apparatus transmits an image of a document scanned at a position not resulting in halation to an addressee represented in a glossy portion of the scanned document detected by the gloss detecting unit, a user can transmit the image without entering an addressee from an operating unit, and therefore, an error in the addressee due to an incorrect input via the operating unit can be prevented.

(b) Because the image processing apparatus determines the authenticity of a scanned document based on identification information represented in a glossy portion of the scanned document detected by the gloss detecting unit, the authenticity of the document can be determined easily. For example, when some documents duplication of which are not desirable, e.g., questionnaires distributed to specific targets in a limited manner, are collected, and the documents include some duplications made without any permission through normal scanning, the authenticity of the document can be determined based on the presence of identification information represented in a glossy portion.

(c) The image processing apparatus performs user authentication based on authentication information represented in a glossy portion of a scanned document detected by the gloss detecting unit, and if the authentication is successful, a process related to the glossy portion detected by the gloss detecting unit, among the entire image of the scanned document, is permitted. In this manner, it is possible to prevent any use of the information represented in the glossy portion by any third party not knowing the authentication information. In this manner, for example, any third party not knowing the authentication information is prohibited from making a duplicate of the information represented in the glossy portion, and a duplicate made by such a third party is prevented from being determined to be authentic in the authenticity determination described in (b) above.

(d) The image processing apparatus makes a duplication based on setting information represented in a glossy portion of a scanned document detected by the gloss detecting unit. In this manner, when a document including print setting information represented in the glossy portion is printed and then duplicated, for example, a user is allowed to duplicate the document following the same setting as those used previously, without setting the print setting information via the operating unit. Therefore, setting mistakes caused by erroneous inputs via the operating unit can be prevented.

(e) The image processing apparatus forms an image of a glossy portion on a sheet medium with a clear toner (clear material) based on information represented in a glossy portion of a scanned document detected by the gloss detecting unit. In this manner, a glossy portion of a document including a glossy portion can be faithfully duplicated by performing printing by applying a clear toner to a position that is same as where a clear toner is present on the document.

(f) The image processing apparatus acquires an image to be formed on a sheet medium, and forms an image in which a glossy portion representing the received information is added to the image thus acquired on a sheet medium. In this manner, any information can be positioned on the sheet medium as information to be used for authenticity determination or authentication, or information to be used as an addressee or in print setting, in the manner described above.

(g) When the image processing apparatus adds a glossy portion representing the received information, the glossy portion is added to the position designated by a user. In this manner, a glossy portion that is visible from a certain angle to human eyes can be added to a position not causing any trouble in the document, so that a negative impact of the glossy portion can be reduced.

The explanations of the embodiment are ended at this point, but a specific configuration of each of the units or an operation performed thereby is not limited to that disclosed in the embodiment in the invention.

For example, the present invention is also applicable to an image forming apparatus using any number of color toners other than four, or to an image forming apparatus that forms an image with a material other than a toner.

Furthermore, the present invention is also applicable to any other image processing apparatus such as an image reading device.

Furthermore, the embodiments, exemplary operations, and configurations according to variations explained so far may be implemented in a manner combined in any way, as long as such a combination is not contradictory.

The image processing apparatus according to the present invention enables highly useful image processing using information represented in a glossy portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a scanning unit that includes a light source and is configured to scan a document to be scanned with the light source at a first illumination position not resulting in halation caused by light of the light source output to the document, and scan the document by moving the light source to a second illumination position resulting in halation caused by the light output to the document;
a gloss detecting unit configured to detect a glossy portion of the document based on images scanned at the first illumination position and the second illumination position; and
a glossy information processing unit configured to perform a predetermined process by using information represented by the detected glossy portion,
wherein the glossy information processing unit includes a transmitting unit configured to transmit the image of the document scanned at the first illumination position to an addressee represented by the glossy portion of the scanned document detected by the gloss detecting unit.

2. The image processing apparatus according to claim 1, wherein the glossy information processing unit includes an authenticity determining unit configured to determine authenticity of the scanned document based on identification information represented by the glossy portion of the scanned document detected by the gloss detecting unit.

3. The image processing apparatus according to claim 1, wherein the glossy information processing unit includes an authenticating unit configured to perform user authentication based on authentication information represented in the glossy portion of the scanned document detected by the gloss detecting unit, and give permission for a process related to the glossy portion detected by the gloss detecting unit, in an image of the scanned document, when the user authentication is successful.

4. The image processing apparatus according to claim 1, wherein the glossy information processing unit includes:
a duplicating unit configured to make a duplication of the scanned document; and
a duplication control unit configured to cause the duplicating unit to make a duplication based on setting information represented by the glossy portion of the scanned document detected by the gloss detecting unit.

5. The image processing apparatus according to claim 4, wherein the duplicating unit forms an image onto a sheet medium based on image data acquired by the scanning unit scanning a document, and includes a unit configured to form an image of a glossy portion of the scanned document detected by the gloss detecting unit onto a sheet medium using a clear material, based on information of the glossy portion.

6. The image processing apparatus according to claim 1, further comprising:
an image forming unit configured to form an image including a glossy portion on a sheet medium;
an information receiving unit configured to receive an input of information;
an image acquiring unit configured to acquire an image to be formed on a sheet medium; and
an image formation control unit configured to cause the image forming unit to form an image in which a glossy portion representing information received by the information receiving unit is added to the image acquired by the acquiring unit.

7. The image processing apparatus according to claim 6, wherein the image formation control unit adds the glossy portion to a position designated by a user.

8. An image processing apparatus comprising:
scanning means, which includes a light source, of scanning a document to be scanned with the light source at a first illumination position not resulting in halation caused by light of the light source output to the document, and scanning the document by moving the light source to a second illumination position resulting in halation caused by the light output to the document;
gloss detecting means of detecting a glossy portion of the document based on images scanned at the first illumination position and the second illumination position; and glossy information processing means of performing a predetermined process using information represented by the detected glossy portion, wherein the glossy information processing means includes a transmitting unit configured to transmit the image of the document scanned at the first illumination position to an addressee represented by the glossy portion of the scanned document detected by the gloss detecting means.

9. An image processing method performed in an image processing apparatus that includes a scanning unit having a light source, a gloss detecting unit, and a glossy information processing unit, the method comprising:

scanning a document to be scanned with the light source at a first illumination position not resulting in halation caused by light of the light source output to the document, and scanning the document by moving the light source to a second illumination position resulting in halation caused by the light output to the document, by the scanning unit;

detecting a glossy portion of the document based on images scanned at the first illumination position and the second illumination position, by the gloss detecting unit;

performing a predetermined process by using information represented by the detected glossy portion, by the glossy information processing unit; and transmitting the image of the document scanned at the first illumination position to an addressee represented by the glossy portion of the scanned document detected by the gloss detecting unit.

* * * * *